United States Patent
Pfeiffer et al.

(10) Patent No.: US 6,714,698 B2
(45) Date of Patent: Mar. 30, 2004

(54) SYSTEM AND METHOD FOR PROGRAMMING AND CONTROLLING A FIBER OPTIC CIRCUIT AND MODULE WITH SWITCH

(75) Inventors: Gregory C. Pfeiffer, Bloomington, MN (US); Keith A. Hamberg, Excelsior, MN (US); Mohammad S. Farooqi, Little Canada, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 180 days.

(21) Appl. No.: 10/044,370

(22) Filed: Jan. 11, 2002

(65) Prior Publication Data

US 2003/0133642 A1 Jul. 17, 2003

(51) Int. Cl.$^7$ ................................................. G02B 6/26
(52) U.S. Cl. ............................. 385/16; 385/19; 385/24; 385/134; 385/135; 385/55; 385/58
(58) Field of Search ............................... 385/16–20, 24, 385/134, 135, 136, 137, 139, 55–59; 324/539, 66, 67; 720/20, 25, 27, 28, 39; 398/49–50

(56) References Cited

U.S. PATENT DOCUMENTS

| | | | |
|---|---|---|---|
| 5,394,503 A | * | 2/1995 | Dietz et al. .................. 385/135 |
| 5,793,909 A | * | 8/1998 | Leone et al. .................. 385/24 |
| 6,002,331 A | * | 12/1999 | Laor ........................ 340/539.1 |
| 6,263,136 B1 | * | 7/2001 | Jennings et al. .............. 385/48 |
| 6,556,738 B2 | * | 4/2003 | Pfeiffer et al. ................ 385/16 |

* cited by examiner

Primary Examiner—Hemang Sanghavi
(74) Attorney, Agent, or Firm—Merchant & Gould P.C.

(57) ABSTRACT

A fiber optic circuit provides signal access and monitoring using a set of various switches. The various switches can be remotely controlled using a programmable controller. This controller implements a method for programming and controlling a fiber optic circuit. The fiber optic circuit includes a plurality of signal connection modules, a signal switching network, and a master controller module. The method receiving a circuit configuration command from a remote computing system, retrieving a connection table containing data entries used to specify how the signal connection modules and the signal switching network are to be configured, constructing a module configuration command for each data entry retrieved from the connection table and transmitting the module configuration command to the corresponding module to configure the fiber optic circuit.

24 Claims, 29 Drawing Sheets

FIG.17 Loopback Mode (TAP Loopback)

FIG.25

Cable Connection Table One. Required Module Arrangement in Chassis One

| 1 | Dual 1x24 Switch (OTAU) SC/LX5 | | |
|---|---|---|---|
| 2 | Dual 1x24 Switch (OTAU) SC/LX5 | | |
| 3 | Single ODSX | Single ODSX | 9 |
| 4 | Single ODSX | Single ODSX | 10 |
| 5 | Single ODSX | Single ODSX | 11 |
| 6 | Single ODSX | Single ODSX | 12 |
| 7 | Single ODSX | Single ODSX | 13 |
| 8 | Single ODSX | Single ODSX | 14 |
| 0 | Master Controller | Dual 2x2 Matrix Switch | 15 |

Required Module Arrangement in Chassis Two

| 1 | Single ODSX | Single ODSX | 7 |
|---|---|---|---|
| 2 | Single ODSX | Single ODSX | 8 |
| 3 | Single ODSX | Single ODSX | 9 |
| 4 | Single ODSX | Single ODSX | 10 |
| 5 | Single ODSX | Single ODSX | 11 |
| 6 | Single ODSX | Single ODSX | 12 |
| 0 | Slave Controller | | 13 |

FIG.26

OPT TL1 command to the actual hardware. The mode parameter selects transmit or receive fiber (path).

| CIRCUIT PARAMETER | ODSX MODULE | CIRCUIT PARAMETER | ODSX MODULE |
|---|---|---|---|
| 1 | Chassis 1, Slot 3 | 13 | Chassis 2, Slot 1 |
| 2 | Chassis 1, Slot 4 | 14 | Chassis 2, Slot 2 |
| 3 | Chassis 1, Slot 5 | 15 | Chassis 2, Slot 3 |
| 4 | Chassis 1, Slot 6 | 16 | Chassis 2, Slot 4 |
| 5 | Chassis 1, Slot 7 | 17 | Chassis 2, Slot 5 |
| 6 | Chassis 1, Slot 8 | 18 | Chassis 2, Slot 6 |
| 7 | Chassis 1, Slot 9 | 19 | Chassis 2, Slot 7 |
| 8 | Chassis 1, Slot 10 | 20 | Chassis 2, Slot 8 |
| 9 | Chassis 1, Slot 11 | 21 | Chassis 2, Slot 9 |
| 10 | Chassis 1, Slot 12 | 22 | Chassis 2, Slot 10 |
| 11 | Chassis 1, Slot 13 | 23 | Chassis 2, Slot 11 |
| 12 | Chassis 1, Slot 14 | 24 | Chassis 2, Slot 12 |

| TAP PARAMETER | MATRIX SWITCH OPERATION |
|---|---|
| 1 | Connect Specified Circuit to Test Equip A(also affects B) |
| 2 | Connect Specified Circuit to Test Equip B(also affects A) |

FIG.27

Cable Connection Table One. Required Optical Patch Cord Connections

These tables are used by the installer and identify every optical connection required to use this cable connection table.

| FROM | TO | FROM | TO |
|---|---|---|---|
| CHASSIS 1 SINGLE ODSX MODULE | CHASSIS 1 DUAL 1X24 SWITCH (OTAU) MODULE | CHASSIS 1 SINGLE ODSX MODULE | CHASSIS 1 DUAL 1X24 SWITCH (OTAU) MODULE |
| SLOT/PORT | SLOT/DEVICE/PORT | SLOT/PORT | SLOT/DEVICE/PORT |
| Slot 3, Path A Rcv | Slot 1, Device 1, Port 1 | Slot 3, Path A Xmt | Slot 1, Device 2, Port 1 |
| Slot 3, Path B Rcv | Slot 1, Device 1, Port 2 | Slot 3, Path B Xmt | Slot 1, Device 2, Port 2 |
| Slot 4, Path A Rcv | Slot 1, Device 1, Port 3 | Slot 4, Path A Xmt | Slot 1, Device 2, Port 3 |
| Slot 4, Path B Rcv | Slot 1, Device 1, Port 4 | Slot 4, Path B Xmt | Slot 1, Device 2, Port 4 |
| Slot 5, Path A Rcv | Slot 1, Device 1, Port 5 | Slot 5, Path A Xmt | Slot 1, Device 2, Port 5 |
| Slot 5, Path B Rcv | Slot 1, Device 1, Port 6 | Slot 5, Path B Xmt | Slot 1, Device 2, Port 6 |
| Slot 6, Path A Rcv | Slot 1, Device 1, Port 7 | Slot 6, Path A Xmt | Slot 1, Device 2, Port 7 |
| Slot 6, Path B Rcv | Slot 1, Device 1, Port 8 | Slot 6, Path B Xmt | Slot 1, Device 2, Port 8 |
| Slot 7, Path A Rcv | Slot 1, Device 1, Port 9 | Slot 7, Path A Xmt | Slot 1, Device 2, Port 9 |
| Slot 7, Path B Rcv | Slot 1, Device 1, Port 10 | Slot 7, Path B Xmt | Slot 1, Device 2, Port 10 |
| Slot 8, Path A Rcv | Slot 1, Device 1, Port 11 | Slot 8, Path A Xmt | Slot 1, Device 2, Port 11 |
| Slot 8, Path B Rcv | Slot 1, Device 1, Port 12 | Slot 8, Path B Xmt | Slot 1, Device 2, Port 12 |
| Slot 9, Path A Rcv | Slot 1, Device 1, Port 13 | Slot 9, Path A Xmt | Slot 1, Device 2, Port 13 |
| Slot 9, Path B Rcv | Slot 1, Device 1, Port 14 | Slot 9, Path B Xmt | Slot 1, Device 2, Port 14 |
| Slot 10, Path A Rcv | Slot 1, Device 1, Port 15 | Slot 10, Path A Xmt | Slot 1, Device 2, Port 15 |
| Slot 10, Path B Rcv | Slot 1, Device 1, Port 16 | Slot 10, Path B Xmt | Slot 1, Device 2, Port 16 |
| Slot 11, Path A Rcv | Slot 1, Device 1, Port 17 | Slot 11, Path A Xmt | Slot 1, Device 2, Port 17 |
| Slot 11, Path B Rcv | Slot 1, Device 1, Port 18 | Slot 11, Path B Xmt | Slot 1, Device 2, Port 18 |
| Slot 12, Path A Rcv | Slot 1, Device 1, Port 19 | Slot 12, Path A Xmt | Slot 1, Device 2, Port 19 |
| Slot 12, Path B Rcv | Slot 1, Device 1, Port 20 | Slot 12, Path B Xmt | Slot 1, Device 2, Port 20 |
| Slot 13, Path A Rcv | Slot 1, Device 1, Port 21 | Slot 13, Path A Xmt | Slot 1, Device 2, Port 21 |
| Slot 13, Path B Rcv | Slot 1, Device 1, Port 22 | Slot 13, Path B Xmt | Slot 1, Device 2, Port 22 |
| Slot 14, Path A Rcv | Slot 1, Device 1, Port 23 | Slot 14, Path A Xmt | Slot 1, Device 2, Port 23 |
| Slot 14, Path B Rcv | Slot 1, Device 1, Port 24 | Slot 14, Path B Xmt | Slot 1, Device 2, Port 24 |

| FROM | TO |
|---|---|
| CHASSIS 1 DUAL 1X24 SWITCH (OTAU) MODULE | CHASSIS 1 DUAL 2X2 MATRIX SWITCH |
| SLOT/DEVICE/PORT | SLOT/PORT |
| Slot 1, Device 1, Common Port | Slot 15, #1 Rcv |
| Slot 1, Device 2, Common Port | Slot 15, #1 Xmt |
| Slot 2, Device 1, Common Port | Slot 15, #2 Rcv |
| Slot 2, Device 2, Common Port | Slot 15, #2 Xmt |

FIG. 28

Cable Connection Table One. Required Optical Patch Cord Connections

These tables are used by the installer and identify every optical connection required to use this cable connection table.

| FROM | TO | FROM | TO |
|---|---|---|---|
| CHASSIS 2 SINGLE ODSX MODULE | CHASSIS 1 DUAL 1X24 SWITCH (OTAU) MODULE | CHASSIS 2 SINGLE ODSX MODULE | CHASSIS 1 DUAL 1X24 SWITCH (OTAU) MODULE |
| SLOT/PORT | SLOT/DEVICE/PORT | SLOT/PORT | SLOT/DEVICE/PORT |
| Slot 1, Path A Rcv | Slot 2, Device 1, Port 1 | Slot 1, Path A Xmt | Slot 2, Device 2, Port 1 |
| Slot 1, Path B Rcv | Slot 2, Device 1, Port 2 | Slot 1, Path B Xmt | Slot 2, Device 2, Port 2 |
| Slot 2, Path A Rcv | Slot 2, Device 1, Port 3 | Slot 2, Path A Xmt | Slot 2, Device 2, Port 3 |
| Slot 2, Path B Rcv | Slot 2, Device 1, Port 4 | Slot 2, Path B Xmt | Slot 2, Device 2, Port 4 |
| Slot 3, Path A Rcv | Slot 2, Device 1, Port 5 | Slot 3, Path A Xmt | Slot 2, Device 2, Port 5 |
| Slot 3, Path B Rcv | Slot 2, Device 1, Port 6 | Slot 3, Path B Xmt | Slot 2, Device 2, Port 6 |
| Slot 4, Path A Rcv | Slot 2, Device 1, Port 7 | Slot 4, Path A Xmt | Slot 2, Device 2, Port 7 |
| Slot 4, Path B Rcv | Slot 2, Device 1, Port 8 | Slot 4, Path B Xmt | Slot 2, Device 2, Port 8 |
| Slot 5, Path A Rcv | Slot 2, Device 1, Port 9 | Slot 5, Path A Xmt | Slot 2, Device 2, Port 9 |
| Slot 5, Path B Rcv | Slot 2, Device 1, Port 10 | Slot 5, Path B Xmt | Slot 2, Device 2, Port 10 |
| Slot 6, Path A Rcv | Slot 2, Device 1, Port 11 | Slot 6, Path A Xmt | Slot 2, Device 2, Port 11 |
| Slot 6, Path B Rcv | Slot 2, Device 1, Port 12 | Slot 6, Path B Xmt | Slot 2, Device 2, Port 12 |
| Slot 7, Path A Rcv | Slot 2, Device 1, Port 13 | Slot 7, Path A Xmt | Slot 2, Device 2, Port 13 |
| Slot 7, Path B Rcv | Slot 2, Device 1, Port 14 | Slot 7, Path B Xmt | Slot 2, Device 2, Port 14 |
| Slot 8, Path A Rcv | Slot 2, Device 1, Port 15 | Slot 8, Path A Xmt | Slot 2, Device 2, Port 15 |
| Slot 8, Path B Rcv | Slot 2, Device 1, Port 16 | Slot 8, Path B Xmt | Slot 2, Device 2, Port 16 |
| Slot 9, Path A Rcv | Slot 2, Device 1, Port 17 | Slot 9, Path A Xmt | Slot 2, Device 2, Port 17 |
| Slot 9, Path B Rcv | Slot 2, Device 1, Port 18 | Slot 9, Path B Xmt | Slot 2, Device 2, Port 18 |
| Slot 10, Path A Rcv | Slot 2, Device 1, Port 19 | Slot 10, Path A Xmt | Slot 2, Device 2, Port 19 |
| Slot 10, Path B Rcv | Slot 2, Device 1, Port 20 | Slot 10, Path B Xmt | Slot 2, Device 2, Port 20 |
| Slot 11, Path A Rcv | Slot 2, Device 1, Port 21 | Slot 11, Path A Xmt | Slot 2, Device 2, Port 21 |
| Slot 11, Path B Rcv | Slot 2, Device 1, Port 22 | Slot 11, Path B Xmt | Slot 2, Device 2, Port 22 |
| Slot 12, Path A Rcv | Slot 2, Device 1, Port 23 | Slot 12, Path A Xmt | Slot 2, Device 2, Port 23 |
| Slot 12, Path B Rcv | Slot 2, Device 1, Port 24 | Slot 12, Path B Xmt | Slot 2, Device 2, Port 24 |

| FROM | TO |
|---|---|
| CHASSIS 1 DUAL 2X2 MATRIX SWITCH | TEST EQUIPMENT |
| SLOT/PORT | PORT |
| Slot 15, A Rcv | 1 Rcv |
| Slot 15, A Xmt | 1 Xmt |
| Slot 15, B Rcv | 2 Rcv |
| Slot 15, B Xmt | 2 Xmt |

SYSTEM AND METHOD FOR PROGRAMMING AND CONTROLLING A FIBER OPTIC CIRCUIT AND MODULE WITH SWITCH

FIELD OF THE INVENTION

The present invention relates to fiber optic circuits and modules for fiber optic equipment, and more specifically to a system and method for programming and controlling a fiber optic circuit and module with a switch.

BACKGROUND OF THE INVENTION

The telecommunications and data transmission industries are rapidly expanding their development of fiber optic transmission systems. Historically, telecommunications signals and data have been transmitted over wire lines such as twisted pair or coaxial cables. In order to accommodate higher signal rate speeds, the industry is turning to increased use of fiber optic cables as the transmission medium.

As the use of fiber optic cables increases, the need for peripheral equipment has increased. For example, it is desirable to have access to a fiber optic line for the purpose of either re-routing the line in the event of damage to the line or to have access to the line for the purposes of monitoring or testing the line.

Fiber optic peripheral equipment for cable management, cable storage, and connection capabilities are well known. The use of modular fiber optic connector modules is known for performing so-called cross-connect applications. U.S. Pat. Nos. 5,432,875 and 5,363,465 to ADC Telecommunications, Inc. concern fiber optic connector modules and chassis designs for receiving the modules in cross-connect applications. There is a continuing need for fiber optic circuits and systems which provide optical signal routing, monitoring, and access capabilities. In addition, a continuing need to automatically configure these circuits and systems to allow efficient configuration of these circuits as needed to assist in providing the optical signal routing, monitoring, and access capabilities.

SUMMARY OF THE INVENTION

The present invention includes a system and method for programming and configuring an optical circuit where the optical circuit connects fiber optic cables and/or equipment, including one or more switches in the optical circuit for changing the optical signal paths of the circuit. The switch or switches can be used to selectively link the optical signal paths to access terminals, such as for signal testing, monitoring or re-routing. The optical circuit may allow for one or more of the following functions for signals passing through the circuit: passing through of the signals, non-intrusive monitoring of the signals, looping back of the signals between the transmit and receive terminals, and replacing the signals using test equipment, such as in combination with test equipment.

In accordance with the invention, one embodiment includes a computer controlled system for programming and controlling a fiber optic circuit. The system includes a plurality of signal connection modules for providing monitoring access to circuit signals, a signal switching network for connecting the signal connection modules to test equipment, and a master controller module for receiving commands from a remote computing system and for configuring the operation of the signal connection modules and the signal switching network. The master controller module comprises a plurality of connection tables, the connection tables contain information for transmitting commands to the signal connection modules and the signal switching network to configure a circuit corresponding to a command received from the remote computing system.

Another embodiment of the present invention includes a computer controlled method for programming and controlling a fiber optic circuit. The fiber optic circuit includes a plurality of signal connection modules, a signal switching network, and a master controller module. The method receiving a circuit configuration command from a remote computing system, retrieving a connection table containing data entries used to specify how the signal connection modules and the signal switching network are to be configured, constructing a module configuration command for each data entry retrieved from the connection table and transmitting the module configuration command to the corresponding module to configure the fiber optic circuit.

Yet another embodiment of the present invention includes a computer data product readable by a computing system and encoding instructions for implementing a computer method for programming and controlling a fiber optic circuit the fiber optic circuit comprises a plurality of signal connection modules, a signal switching network, and a master controller module. The fiber optic circuit includes a plurality of signal connection modules, a signal switching network, and a master controller module. The method receiving a circuit configuration command from a remote computing system, retrieving a connection table containing data entries used to specify how the signal connection modules and the signal switching network are to be configured, constructing a module configuration command for each data entry retrieved from the connection table and transmitting the module configuration command to the corresponding module to configure the fiber optic circuit.

The circuits of the present invention may be used in a variety of applications, such as for looping back of signals, or for splitting signals in combination with test equipment.

BRIEF DESCRIPTION OF THE DRAWINGS

In the drawings, wherein like reference letters and numerals indicate corresponding elements throughout the several views:

FIG. 25 illustrates an arrangement of circuit modules within two chassis in accordance with an example embodiment of the present invention;

FIG. 26 illustrates a set of values for a connection table for use by a master controller processing module in accordance with an example embodiment of the present invention;

FIGS. 27–28 illustrates a set of patch cord connections utilized with the arrangement of circuit modules shown in FIG. 25 and connection table values shown in FIG. 26 to implement a desired test circuit connection in accordance with the present invention;

DETAILED DESCRIPTION

Figure 1:
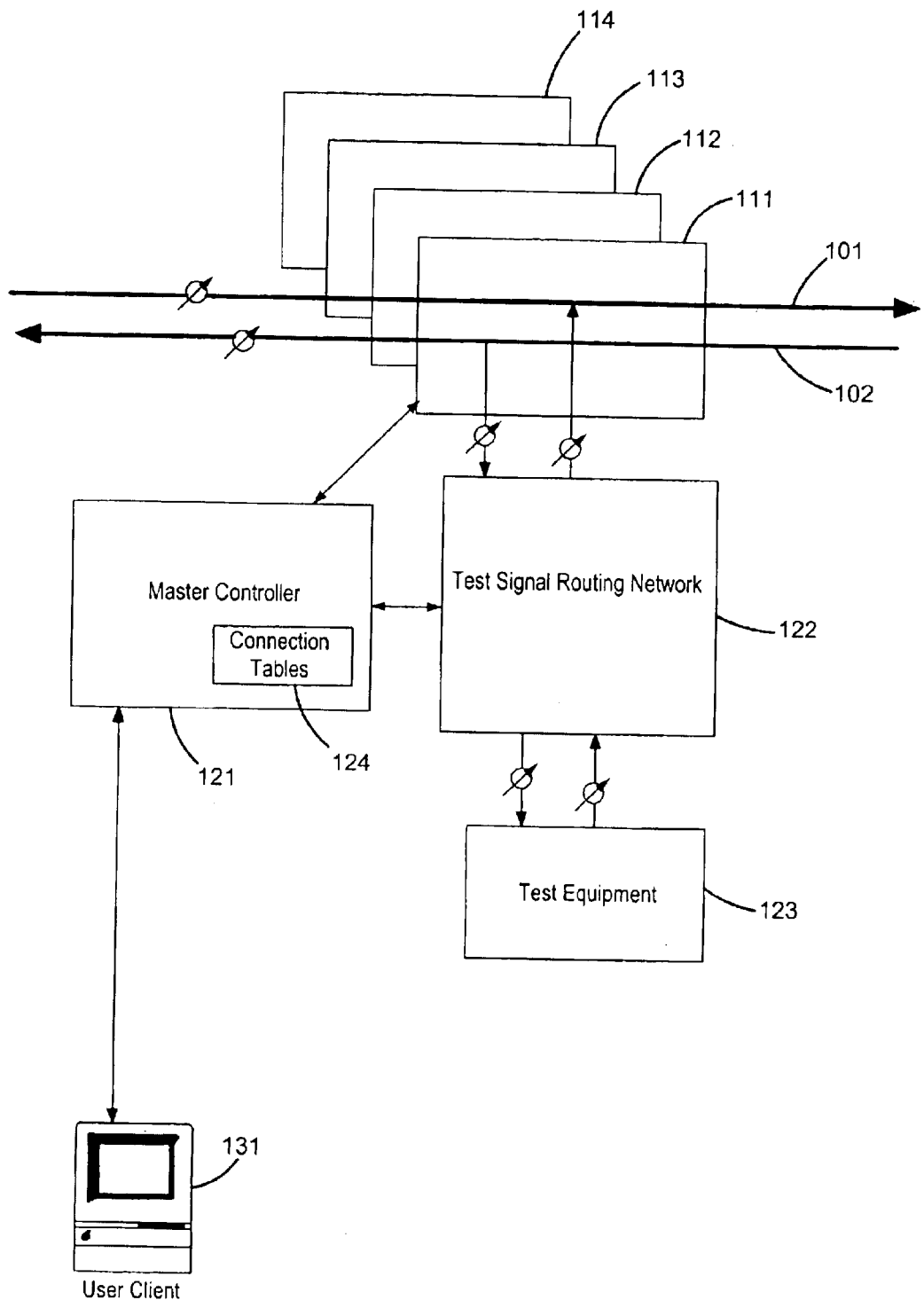
FIG. 1 illustrates a system for programming and controlling an optical circuit in accordance with the invention.

The present invention relates to a system and method for programming and controlling a fiber optic circuit and module with a switch. FIG. 1 illustrates a system for programming and controlling an optical circuit in accordance with the invention. The system includes a master controller processing module 121 having a set of connection tables 124 for use in configuring the operation of a signal switching network 122. This signal switching network 122 is used to connect optical signal connections 101–102 that are routed through one of a plurality of signal connection modules 111–114 to a piece of test equipment 123. This signal switching network 122 allows these optical signal connections 101–102 to be tested using the test equipment as needed. The master controller processing module 121 operates in response to commands received from a remote computing system 131.

The master controller processing module 121 offers a user flexibility in configuring the modules 111–114 and 122 for a desired application. A user may also choose to treat the system (121, 122, 111, 112, 113, 114) as a pre-cabled black box. In this application, optical patch cord placement and the type and location of every module is predefined. There are several predefined cabling setups available called cable connection tables.

Predefined cable connection tables allow several modules involved in a single test access to all be controlled by a single command. A cable connection table can span multiple chassis and defines the configuration of and the physical fiber interconnections between the different modules. These tables allow the user to address the fiber circuit of interest and link it to the test equipment of interest without any knowledge of the fiber routing provided by the master controller processing module 121 software modules. To enable use of the cable connection tables, an ED-EQPT command with the EN-TBL keyword is sent from the remote computer 131 to the master controller processing module 121.

For example: ed-eqpt:Master Chassis:0-0-0:ctag:::en-tbl= on;

To select a particular cable connection entry from the connections tables 124, such as cable connection table #2, an ED-EQPT command with the CONN-TBL keyword is transmitted.

For example: ed-eqpt:Master Chassis:0-0-0:ctag:::conn-tbl=2;

Cable connection tables are numbered beginning with one. The cable connection table selection and its enable state can be viewed with a RTRV-EQPT command.

For example: rtrv-eqpt:Master Chassis:0-0-3:ctag;

The form of the CONN-TACC-OPT command changes when the cable connection tables are enabled. When the tables are not enabled, it is necessary to specify the desired chassis, slot, device, and fiber port to access a fiber. Using the cable connection table, details of the fiber routing is hidden from the user. The chassis, slot, device, and fiber port designations are replaced by a circuit number. The circuit number parameter corresponds to a transmit/receive fiber pair as would be terminated by an ODSX module or a dual splitter module. The test access port (tap) parameter controls a matrix switch to permit the utilization of multiple test devices. The tap parameter starts with one and is only used if the selected cable connection table includes a matrix switch. Everything that can be done using a cable connection table can also be done without the use of these tables. Additional descriptions of pre-defined cable connection tables are discussed below in reference to FIGS. 27–29.

The Master Controller receives commands from a remote client 131 by operating as a telnet server using a standard port. The telnet server interface conforms to the Network Virtual Terminal (NVT) standard described in the telnet RFC 854 and others. One skilled in the art will recognize that other forms of remote client communications of commands may be used without deviating from the spirit and scope of the present invention as recited within the attached claims.

Figure 2:
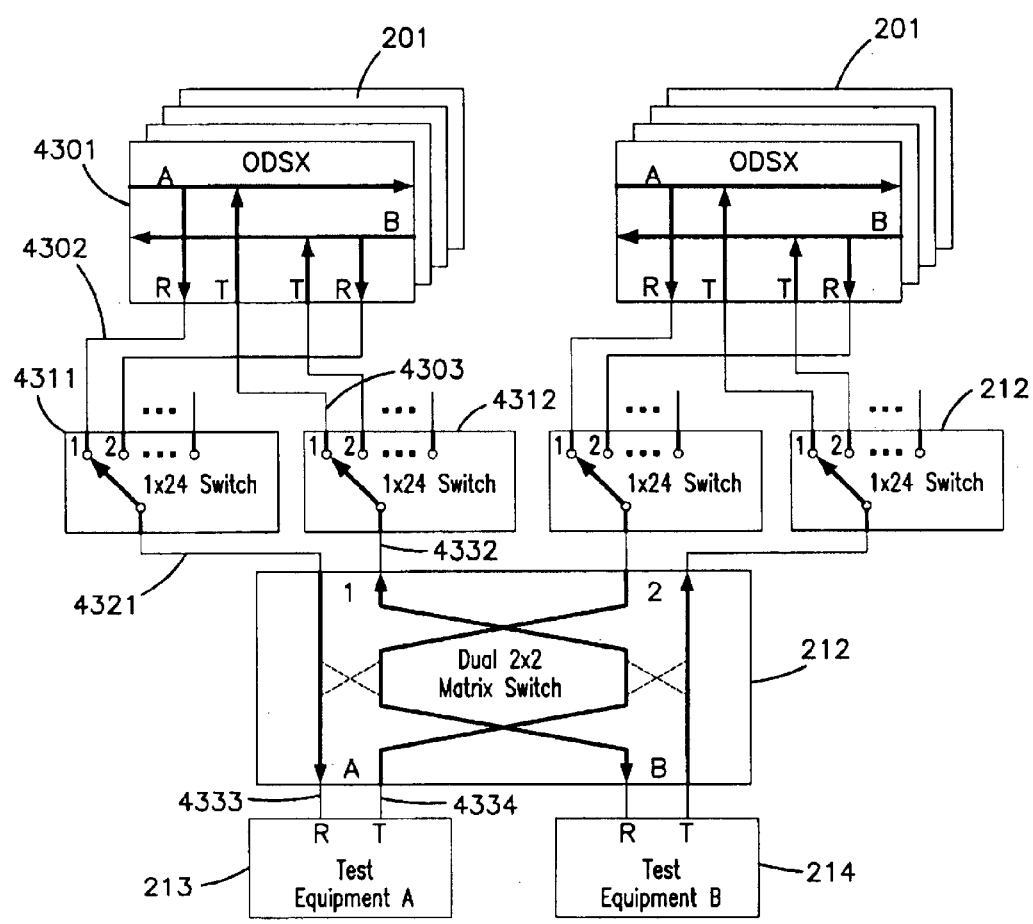
FIG. 2 illustrates another embodiment of a system for programming and controlling an optical circuit in accordance with the invention.

FIG. 2 illustrates an embodiment of a switching network for use with an optical circuit in accordance with the invention. As discussed above, the system in FIG. 1 may be used to connect optical signals contained within circuit modules 201 to test equipment 213–214. This connection of these electrical signals to the test equipment 213–214 allows the signals to be intrusively and non-intrusively tested as needed.

The optical signals are routed to the test equipment using a test signal routing network that consists of a plurality of switching elements. In the example embodiment shown in FIG. 2, the test signal routing network includes a plurality of 1×24 switching elements 211 and a dual 2×2 matrix switching element 212. Each of the optical signals that may be tested are routed through the optical cross connect switching (ODSX) modules 201. These ODSX modules 201 allow a signal pair contained within a single ODSX module 201 to be routed to the test equipment 213–214 at any given time. This signal routing occurs with the 1×24 switching elements 211 and the 2×2 matrix switching element 212 being configured in a manner that provides the desired signal routing.

The master controller discussed in reference to FIG. 1 is responsible for configuring these switching elements to create the desired connection between the optical signals found on the ODSX modules 201 and the test equipment 213–214. Because the placement of these modules within a given chassis does not change frequently and because the test connections desired are typically defined in terms of routing a single ODSX module's 201 optical circuit to the test equipment 213–214, a set of pre-defined settings for the switching elements to create the desired circuit may be stored within connection tables for use in configuring these connections as needed.

Figure 3:
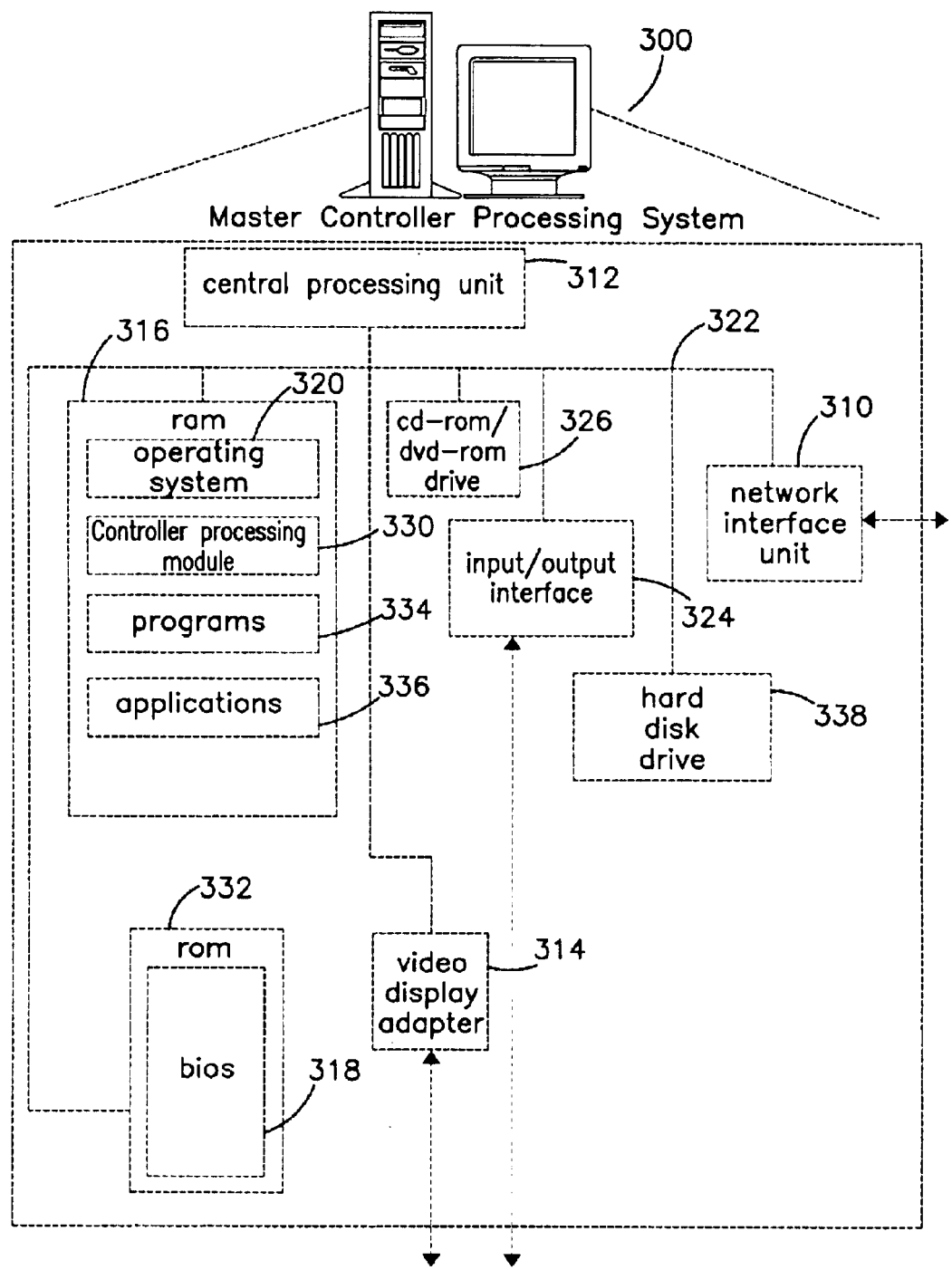
FIG. 3 illustrates an example embodiment for a programmable processing system for use as part of a system for programming and controlling an optical circuit in accordance with the invention.

FIG. 3 illustrates an example embodiment for a programmable processing system for use as part of a system for programming and controlling an optical circuit in accordance with the invention. FIG. 3 specifically shows an exemplary master controller processing system 300 that is operative for programming and controlling a fiber optic switch. Accordingly, the master controller processing system 300 receives commands from a remote client 131 to send commands within the test system to configure the operation of various switch settings to program and control the operation of the test system.

Those of ordinary skill in the art will appreciate that the master controller processing system 300 may include many more components than those shown in FIG. 3. However, the components shown are sufficient to disclose an illustrative embodiment for practicing the present invention. As shown in FIG. 3, the master controller processing system 300 is connected to a WAN/LAN, or other communications network, via network interface unit 310. Those of ordinary skill in the art will appreciate that network interface unit 310 includes the necessary circuitry for connecting a master controller processing system to WAN/LAN, and is constructed for use with various communication protocols including the TCP/IP protocol. Typically, network interface unit 310 is a card contained within the master controller processing system 300.

The master controller processing system 300 may also include processing unit 312, video display adapter 314, and a mass memory, all connected via bus 322. The mass memory generally includes RAM 316, ROM 332, and one or more permanent mass storage devices, such as flash memory, a hard disk drive 328, a tape drive, CD-ROM/DVD-ROM drive 326, and/or a floppy disk drive. The mass memory stores operating system 320 for controlling the operation of master controller processing system 300. It will be appreciated that this component may comprise a general purpose operating system as is known to those of ordinary skill in the art, such as UNIX, LINUX™, MAC OS®, or Microsoft WINDOWS NT® or an embedded real time operating system (RTOS) Basic input/output system ("BIOS") 318 is also provided for controlling the low-level operation of master controller processing system 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a master controller processing and network development. More specifically, the mass memory stores applications including master controller processing module 330, programs 334, and other applications 336. Master controller processing module 330 includes computer executable instructions which, when executed by master controller processing system 300, performs the logic described above.

The master controller processing system 300 also comprises input/output interface 324 for communicating with external devices, such as a mouse, keyboard, scanner, or other input devices not shown in FIG. 3. Likewise, master controller processing system 300 may further comprise additional mass storage facilities such as Flash, CD-ROM/DVD-ROM drive 326 and hard disk drive 328. The mass storage is utilized by master controller processing system 300 to store, among other things, application programs, databases, and program data used by master controller processing module 330. For example, customer databases, product databases, image databases, and relational databases may be stored. The operation and implementation of these databases is well known to those skilled in the art.

One skilled in the art may readily recognize that a master controller processing system 300 may possess only a subset of the components described above without deviating from the spirit and scope of the present invention as recited within the attached claims. For example, in one embodiment, the mass storage devices for the master controller processing system 300 may be eliminated with all of the data storage being provided by solid state memory. Programming modules may be stored in ROM or EEPROM memory for more permanent storage where the programming modules consist of firmware that is loaded or updated infrequently. Similarly, as an embedded processing system, many of the user interface devices such as input devices and display devices may also not be present.

Figure 4A:
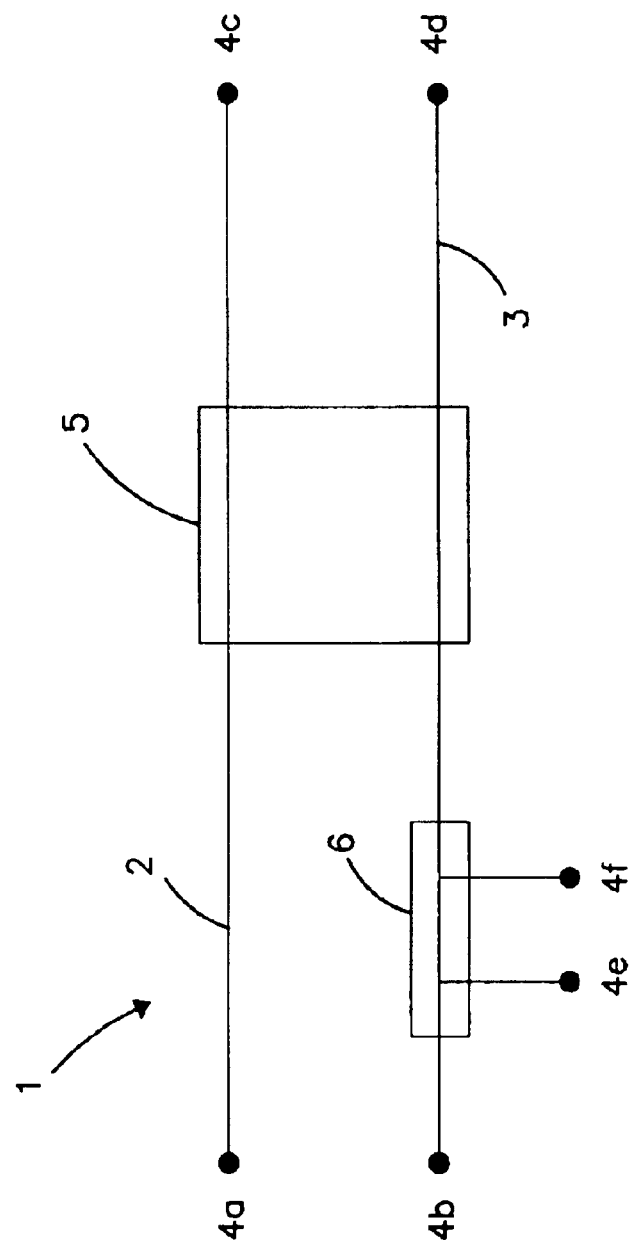
FIG. 4A is a schematic diagram of an optical circuit in accordance with the invention.

In order to better understand the operation of a master controller module and its use in configuring a system, the operation of the fiber optic circuit and switches should be considered. Referring now to FIG. 4A, a schematic representation of an optical circuit 1 in accordance with the present invention is shown including two optical signal pathways 2, 3 linking connection locations 4a and 4c, and 4b and 4d, respectively. Connection locations 4a–d may be any type of fiber optic connection system including fiber optic connectors/adapters, fiber optic splices, or other fiber optic connection system for transmitting fiber optic signals. A switch 5 between the two signal pathways 2, 3 allows normal passing through of the signals along each signal pathway in one state, and looping back of the signals in a second state. In the looping back state, connection location 4a can communicate with connection location 4b, and connection location 4c can communicate with connection location 4d. One example switch 5 is a 2×2 optical switch. Access to one or both of the signal pathways 2, 3 can be provided to the circuit by access arrangement 6, shown in the example as providing access to signal pathway 3. Preferably, access arrangement 6 provides an optical link between signal pathway 3 and connection locations 4e and 4f. Access to signal pathway 3 can be provided by a variety of devices including non-intrusive monitors and/or switches, such as 1×2 switches or 2×2 switches. Access to other portions of signal pathway 3, such as between switch 5 and connection location 4d can also be provided instead of or in addition to access arrangement 6. Similarly, access arrangements can be provided in signal pathway 2, in a similar manner. Circuit 1 has a variety of applications in fiber optic systems where access to one or more of the fiber optic pathways is desired.

Figures 4, 5:
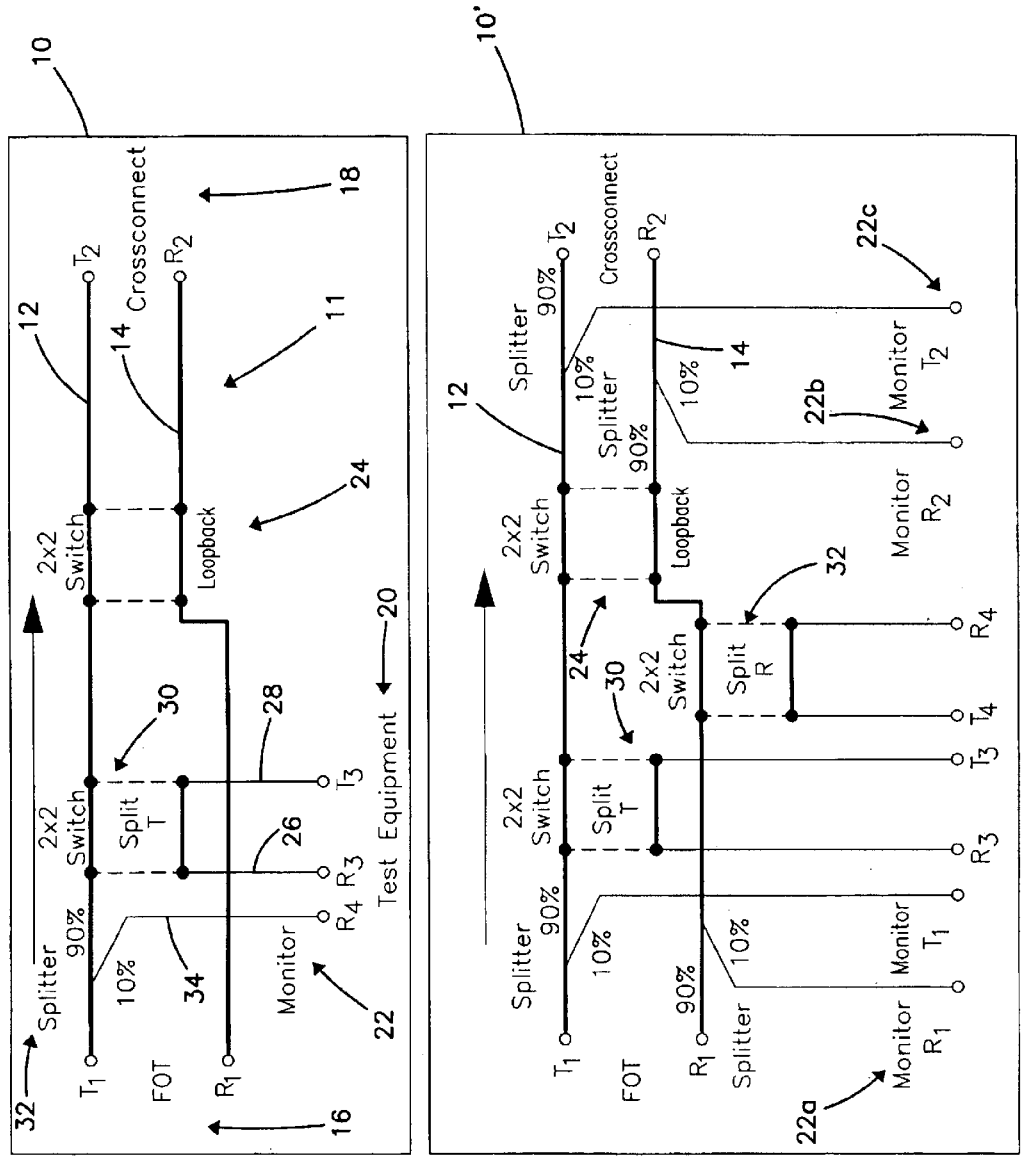
FIG. 4 is a schematic diagram of a first embodiment of a fiber optic access module in accordance with the present invention.
FIG. 5 is a schematic representation of various features which may be provided with various fiber optic access modules in accordance with the present invention.

Referring now to FIG. 4, a first preferred embodiment of a fiber optic module 10 using the circuit features of FIG. 4A is shown for cross-connecting fiber optic cables, and for providing test and access locations. Module 10 includes an optical circuit 11 including a transmit signal pathway 12 and a receive signal pathway 14 extending between fiber optic terminals or ports 16 and cross-connect terminals or ports 18. Specifically, fiber optic terminals (FOT) 16 include a transmit terminal T1 and a receive terminal R1. Cross-connect terminals 18 include transmit terminal T2 and receive terminal R2. Preferably, module 10 includes access terminals or ports for allowing access to signals passing through module 10. For example, test equipment and/or monitors can be optically linked to one of the transmit or receive signal pathways 12, 14. In the embodiment of FIG. 4, test equipment 20, and monitor 22 is linked to transmit signal pathway 12.

While use of two modules cross-connected together is shown in FIGS. 4–30, it is to be appreciated that circuit 11 can be mounted in other module housings, racks or frames, and circuit 11 can be part of a larger circuit within the same module housing, rack or frame as desired.

One or more switches are provided to selectively connect and disconnect the various signal pathways within module 10. For example, a first switch 24 is positioned to selectively connect and disconnect transmit signal pathway 12 with receive signal pathway 14. Further, switch 24 disconnects the connection between terminals T1 and T2, and terminals R1 and R2, when transmit signal pathway 12 is linked to receive signal pathway 14. A 2×2 optical switch is one preferred structure for switch 24.

As shown in FIG. 4, a second 2×2 optical switch is provided between terminal T1 and first switch 24. Second switch 30 allows a normal through path along transmit signal pathway 12 between terminals T1 and T2. Switch 30 further provides a loopback pathway between pathways 26 and 28 so as to optically link receive terminal R3 with transmit terminal T3 of test equipment 20. When second switch 30 is placed in a second state, transmit signal pathway 12 is interrupted and terminal T1 becomes optically linked with terminal R3, and terminal T3 becomes optically linked with terminal T2.

In module 10 of FIG. 4, a splitter 32 splits a portion of the signal from transmit signal pathway 12 and diverts it to a monitor pathway 34 optically linked to monitor terminal T1. Access to monitor pathway is by monitor terminal R4. One preferred splitter is a 90%–10% type splitter, although any percentage splitter is useable.

Module 10 can be utilized in five modes of operation if desired: normal, loopback, split/loopback, split, and monitor. In the normal mode of operation, first and second switches 24, 30 will be positioned so that the signals flow from terminals T1 to T2, and from terminals R2 to R1. The normal mode of operation also provides a loopback of the test equipment through second switch 30. Monitor mode is present at all times to monitor the signal in transmit signal pathway 12.

When the first switch 24 is in the loopback position, and the second switch 30 is in the normal position, module 10 is in the loopback mode. The signals flow from terminals T1 to R1, from terminals T2 to R2 and from terminals T3 to R3.

When the first switch 24 is in the loopback position and the second switch 30 is in the split position, module 10 is in the split/loopback mode. The signals flow from terminals T1 to R3, from terminals T2 to R2 and from terminals T3 to R1.

When the second switch 30 is in the split position and the first switch 24 is in the normal position, module 10 is in the split mode. The signals flow from terminals T1 to R3, from terminals T3 to T2, and from terminals R2 to R1.

Figure 6:
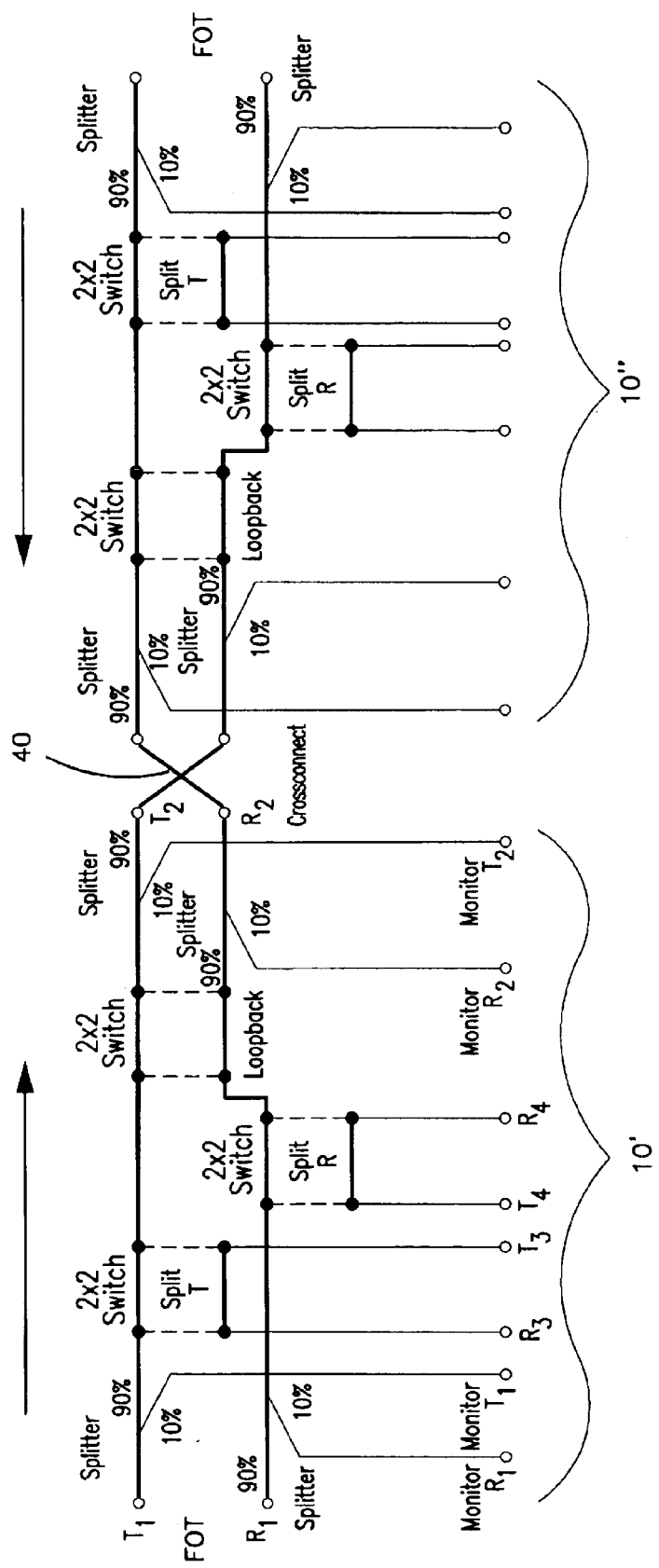
FIG. 6 is a schematic representation of two fiber optic access modules cross-connected together, and showing various features which may be provided with the various fiber optic modules of the present invention.

FIG. 5 illustrates schematically various features for module 10'. Module 10 of FIG. 4 is one embodiment of module 10'. Module 10' includes a 2×2 switch 32 in receive signal pathway 14. Typically, although not required, such a switch would be provided instead of second switch 30. Also, other monitors 22a, 22b, 22c may be provided at various points in the transmit and receive signal pathways 12, 14, if desired. Generally, module 10' would not likely exist with all of the features shown. FIG. 5 is provided to illustrate the wide variety of functions that could be provided as desired to access and monitor the various signal pathways at various points in the module. FIG. 6 shows schematically the module 10' representation of FIG. 5 cross-connected at cross-connection location 40 to a second module 10".

Figure 7:
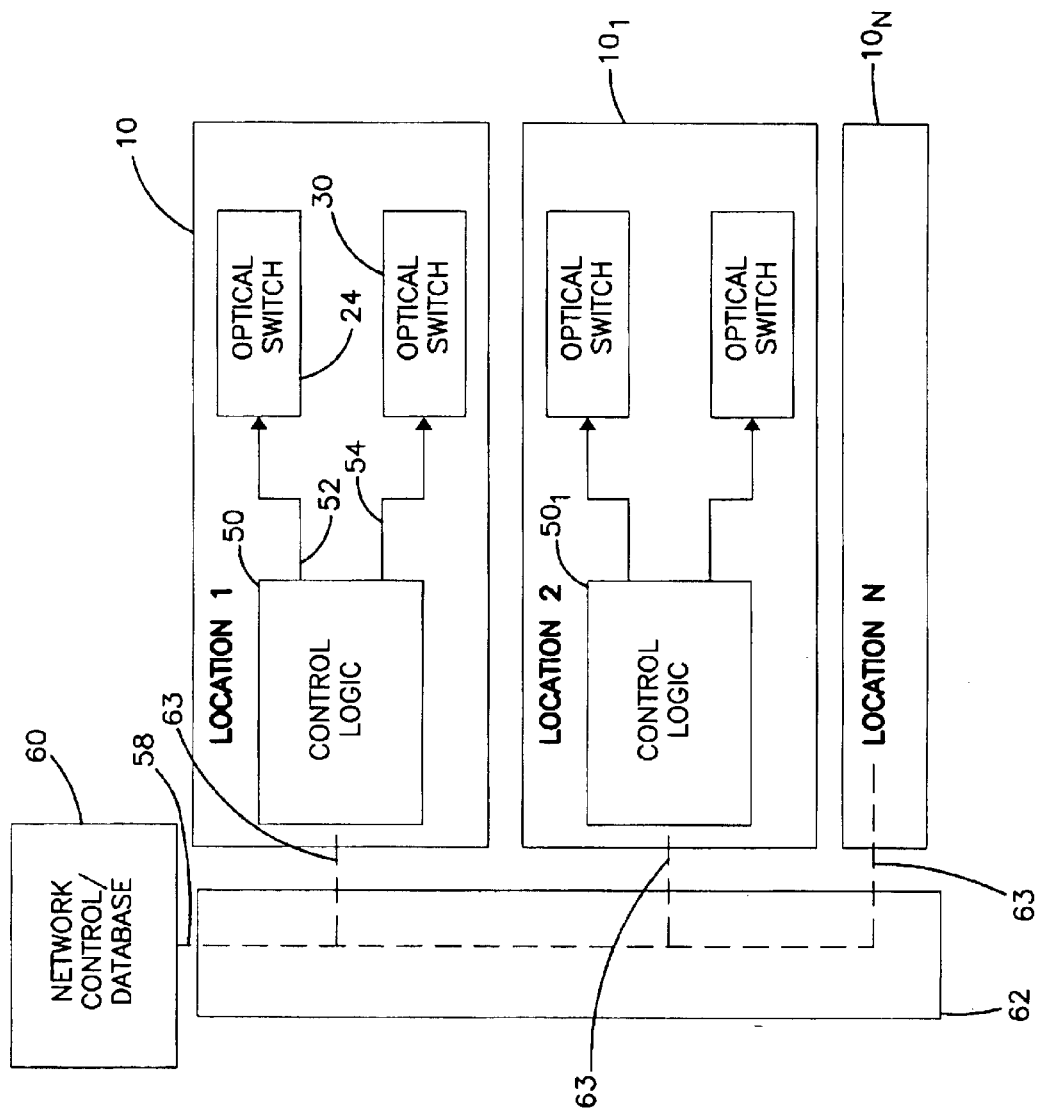
FIG. 7 is a schematic diagram of a control system for remotely controlling the optical switches in the fiber optic access modules.
Figure 8:
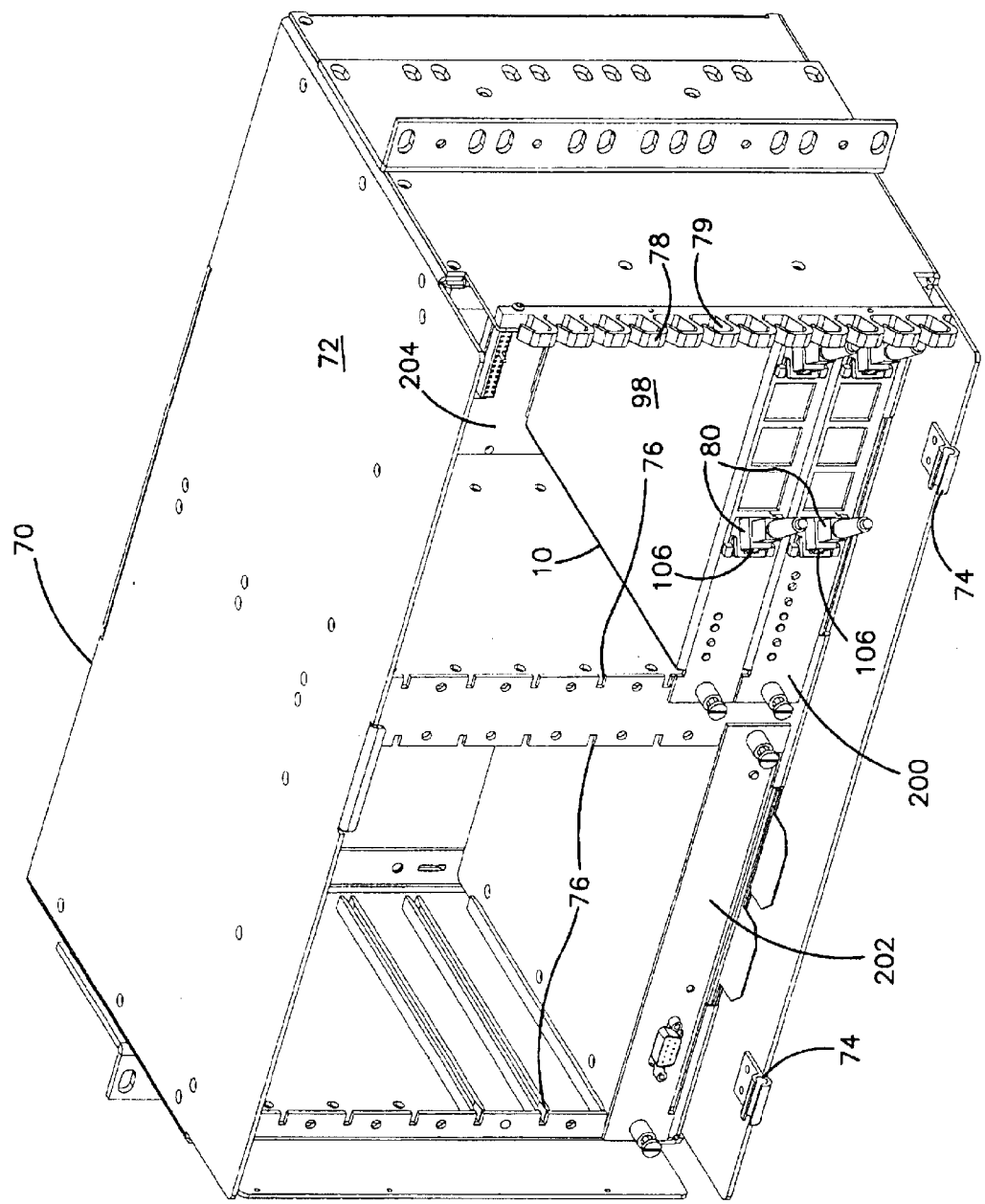
FIG. 8 is a perspective view of a chassis showing two fiber optic access modules mounted thereto.
Figure 9:
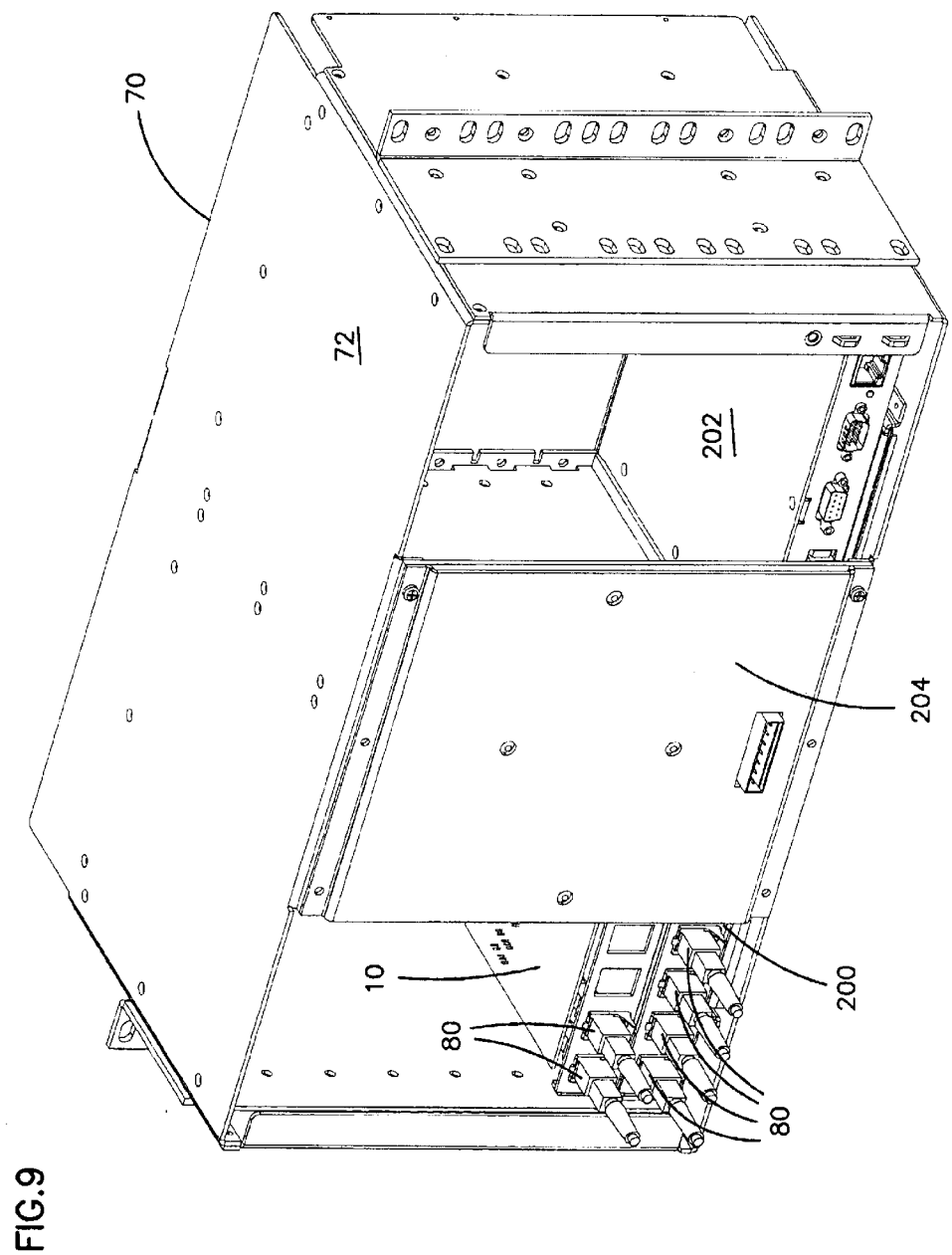
FIG. 9 is a rear perspective view of the chassis and modules shown in FIG. 8.
Figure 10:
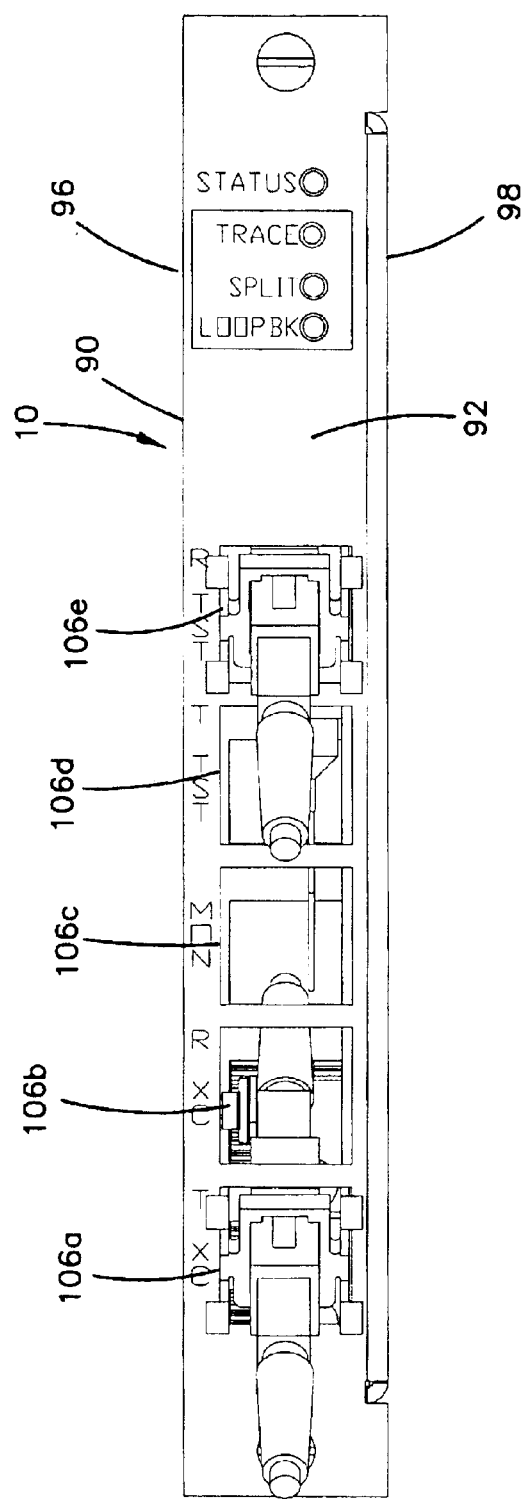
FIG. 10 is a front view of the single circuit fiber optic access module.
Figure 11:
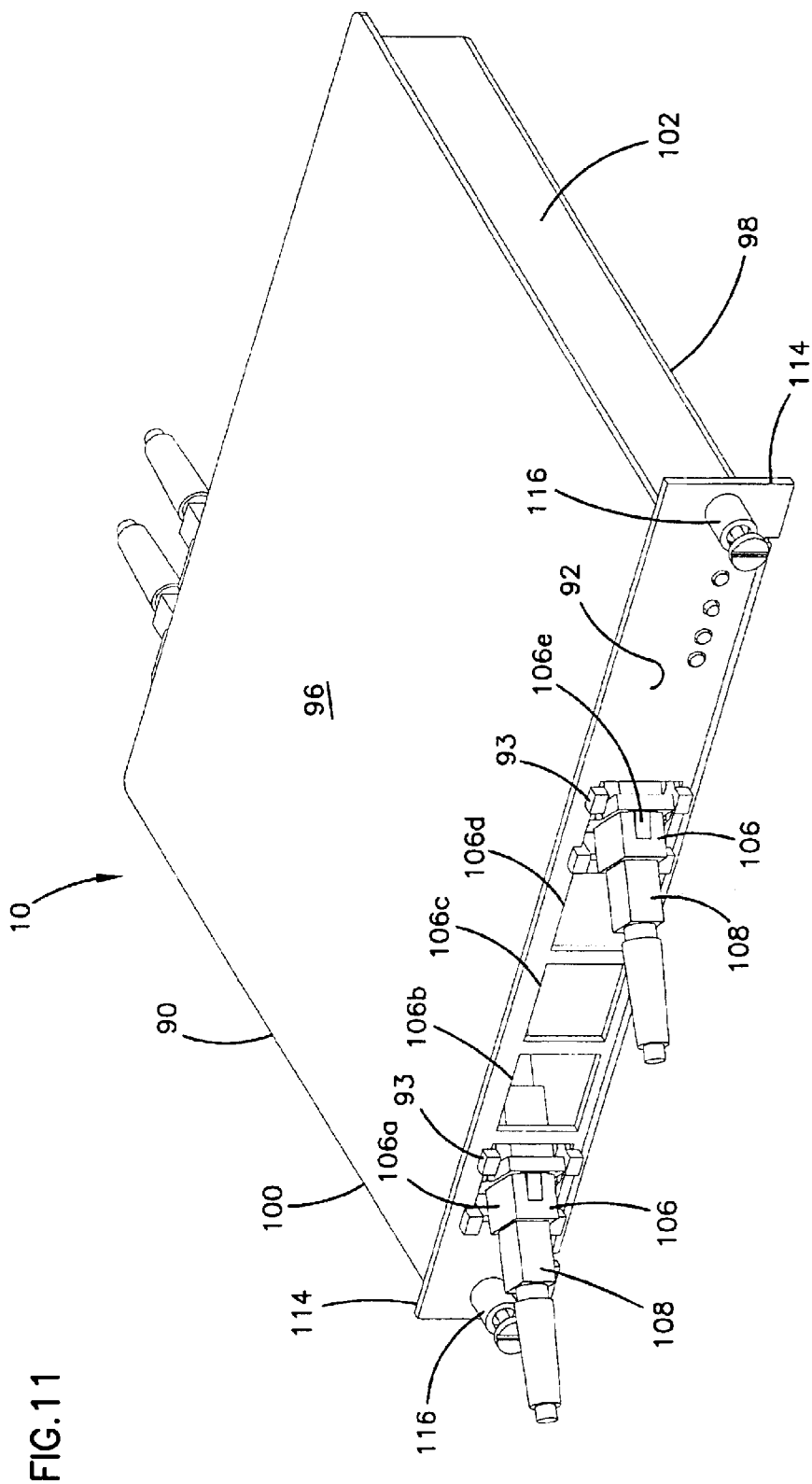
FIG. 11 is a front perspective view of the module of FIG. 10.
Figure 12:
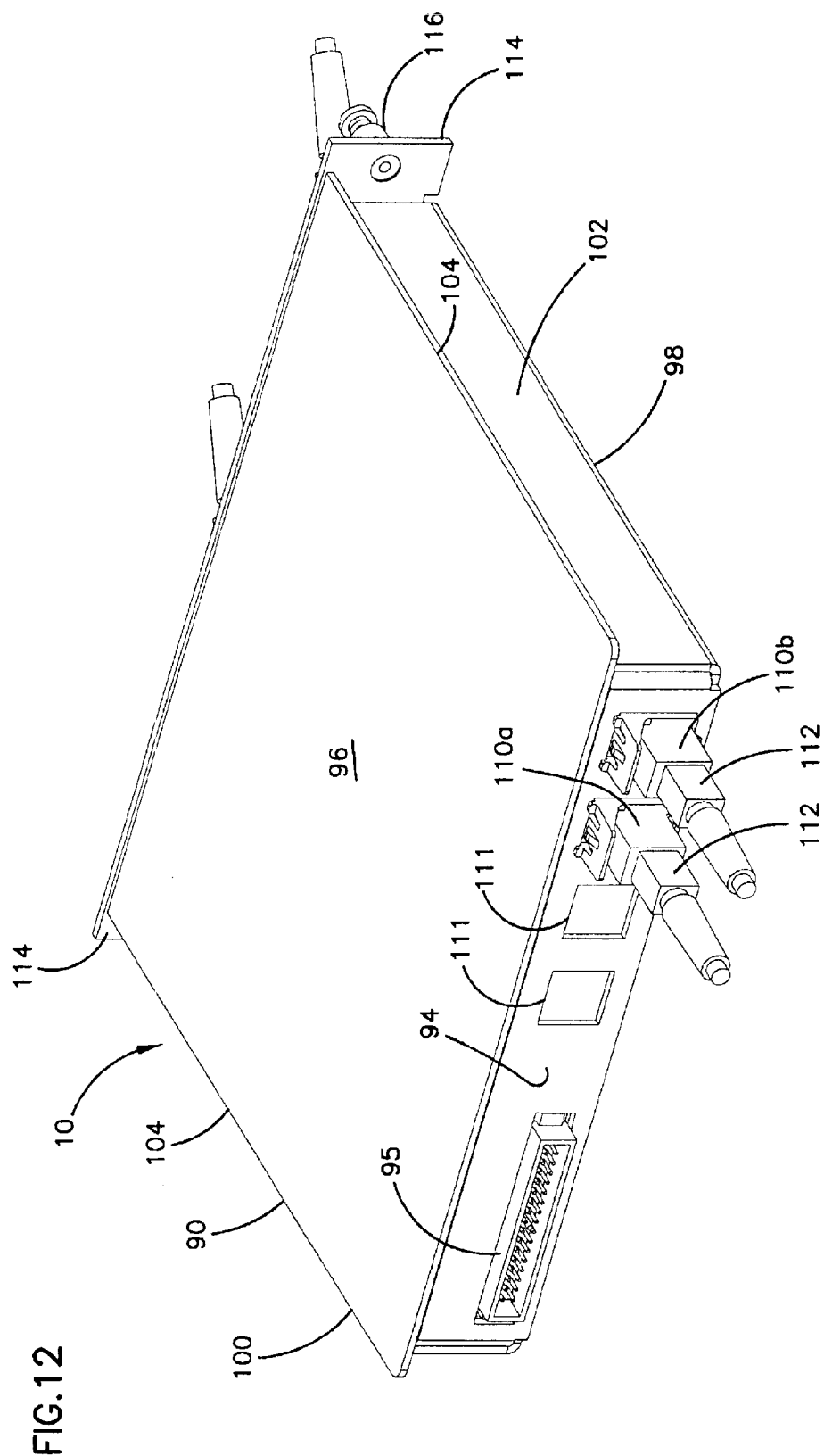
FIG. 12 is a rear perspective view of the module of FIG. 10.
Figure 13:
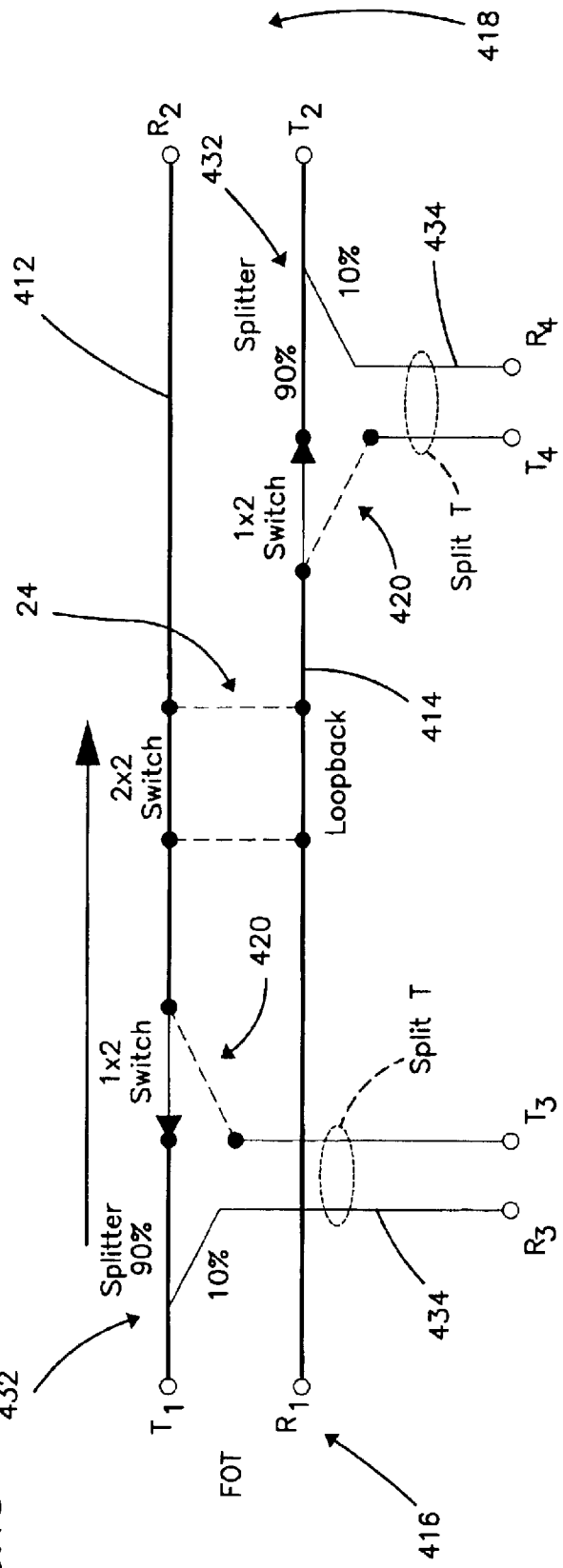
FIG. 13 is a schematic diagram of a third embodiment of a fiber optic access module including a 2×2 loopback switch, and two 1×2 split switches, one positioned in each primary signal pathway.

Referring now to FIG. 7, the optical switches 24, 30 of module 10 can be operated remotely, if desired. Remote control is useful for remote accessing with test equipment. Alternatively, switches could be operated manually. In the case of remote control, control logic 50 is provided for each module $10_1, 10_2 \ldots 10_n$. Links 52, 54 between control logic 50 operate each switch 24, 30. A network control/database 60 controls each control logic $50_1, 50_2 \ldots 50_n$ by a link 58. Link 58 can be by ethernet, RS232, RS485, or other links. FIG. 7 also illustrates distributed control by controller 62 which may provide central local control of control logic 50 of each module 10 through links 63.

Referring now to FIGS. 8–12, a fiber optic chassis 70 is shown for holding a plurality of the fiber optic modules 10. Chassis 70 is mountable to a rack (not shown) for holding chassis 70. Chassis 70 includes an outer housing 72 and a pivotally mounted front door (not shown) hinged at hinge 74. Front door allows access to an interior of chassis 70, so as to access individual modules 10 such as for repair or replacement of modules 10 or to connect or disconnect the modules with other modules or fiber optic equipment. Chassis 70 includes a plurality of guides 76 for holding the individual modules 10 in a horizontal manner. Side opening 78 and cable clips 79 allows for cable pathways into and out of chassis 70.

Modules 10 have connection locations, terminals or ports 80 along the front and the rear. The modules 10 may be used for interconnecting the fiber optic equipment as desired, instead of through a traditional cross-connect connection.

Module 10 has a module housing 90 including a front face 92 and an opposite facing rear face 94. The front and rear faces 92, 94 each define connection locations 80 for connecting module 10 to fiber optic cables. In the embodiment shown, the front connection locations 80 are angled relative to front face 92, and the rear connection locations 80 extend transversely relative to rear face 94.

Module 10 further includes opposed major planar sides 96, 98. Module 10 further includes opposed minor planar sides 100, 102 defining sides of module 10 in the embodiment shown. Major side 96 has side extensions or flanges 104 which form slide rails for receipt in guides 76 of chassis 70. The module and chassis interface may be configured in accordance with commonly owned U.S. Pat. No. 5,363,465, which permits the modules to be flipped as they are moved from the left side to the right side and vice versa. Module 10 can be mounted vertically, if desired, instead of horizontally in a suitably configured chassis.

Module 10 includes a plurality of first adapters 106a–e (generally 106) exposed along front face 92 for the front connection locations 80 for connection to fiber optic connectors 108. In the FIGS. only adapters 106a and 106e are shown, but adapters 106b–d are similarly constructed. Adapters 106 are mounted to front face 92 by angled retainers 93, such as the type described and shown in U.S. Pat. No. 5,214,735. A plurality of second adapters 110a,b (generally 110) are positioned along rear face 94 for the rear connection locations 80, also for connection to fiber optic connectors 112. The first and second adapters 106, 110 are preferably positioned in linear arrays parallel to front and rear faces 92, 94. The adapters shown are SC type, but could also be FC, ST, or any other suitable connection scheme. Two of the first adapters 106 (106a,b) are used to cross-connect fiber optic equipment connected to the second adapters 110a,b of module 10. Alternatively, module 10 can be interconnected to other equipment via front adapters 106. In the illustrated embodiment, adapter 106c defines a monitor port, and adapters 106d,e are used as access locations such as for connection to test equipment.

Module 10 includes two openings 111 which are not used in module 10. Now with reference to FIGS. 8 and 9, an additional module 200 is shown. Module 200 is a double density module where two pieces of equipment can be connected to module 200, for cross-connection through module 200 at front adapters 106. Front adapters 106 in module 200 are dual density adapters such as the type disclosed in commonly assigned U.S. Pat. No. 5,971,625 or U.S. Pat. No. 6,142,676, the disclosures of which are incorporated herein by reference.

Module 10 further includes end flanges 114 for use in mounting module 10 to chassis 70. Locking members 116 releasably hold flanges 114 to chassis 70. Locking members 116 include spring loaded and retained screws. Other locking members, besides screws may be used as desired, such as the type shown and described in U.S. Pat. No. 5,363,465 which operate to lock or release by rotating 90°.

Modules 10, 200 are electrically powered and are connected to a controller module 202 through a controller bus 204 of chassis 70. Plug 95 connects each module 10 to bus 204.

Referring now to FIGS. 13–24, one embodiment of a module 410 is shown. Module 410 includes a single 2×2 switch 24 positioned between first and second signal pathways 412, 414. Signal pathways 412, 414 link a first pair of fiber optic terminals 416 with a second pair of terminals 418. Module 410 further includes a 1×2 switch 420 in each signal pathway 412, 414. Further, module 410 also includes a splitter 432 and a monitor pathway 434 linked to monitor test equipment in each signal pathway 412, 414. The 1×2 switches 420 allow for module 410 to be manufactured more inexpensively since only three switches 24, 420, 420 are provided.

Figure 14:
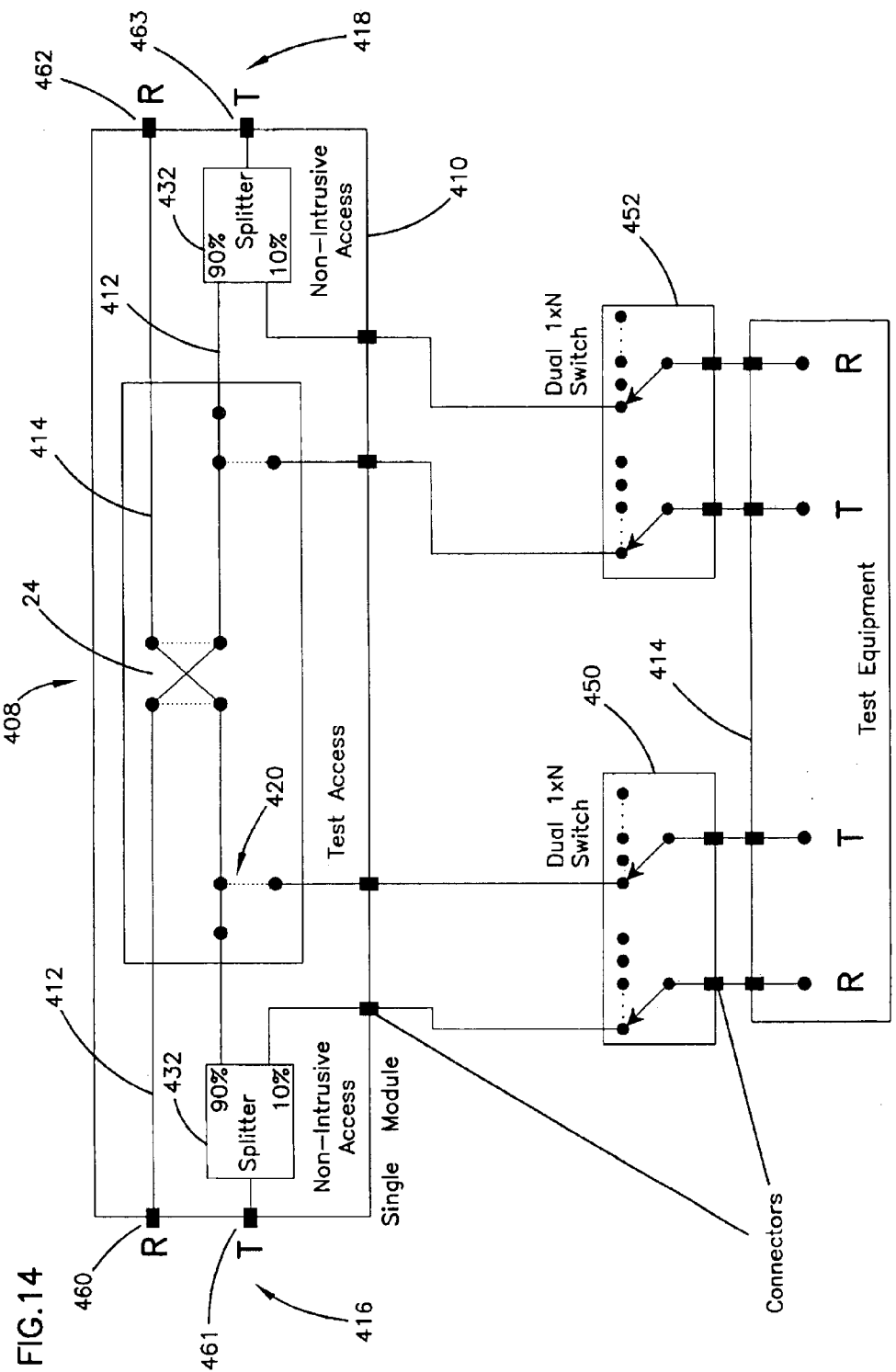
FIG. 14 shows the module of FIG. 13 connected to fiber optic test equipment.
Figure 15:
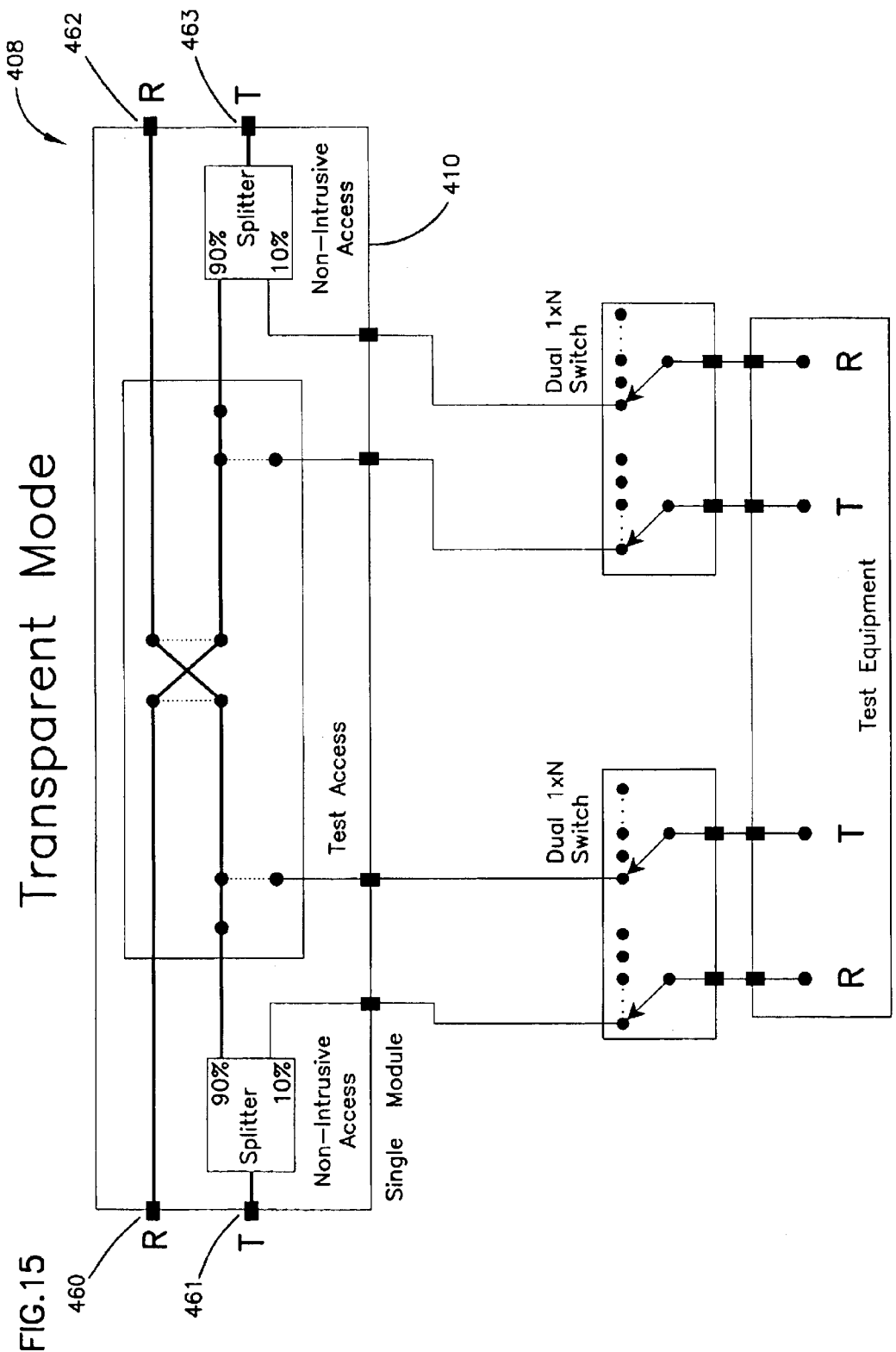
FIGS. 15–24 show various applications of the module of FIG. 14.
Figure 16:
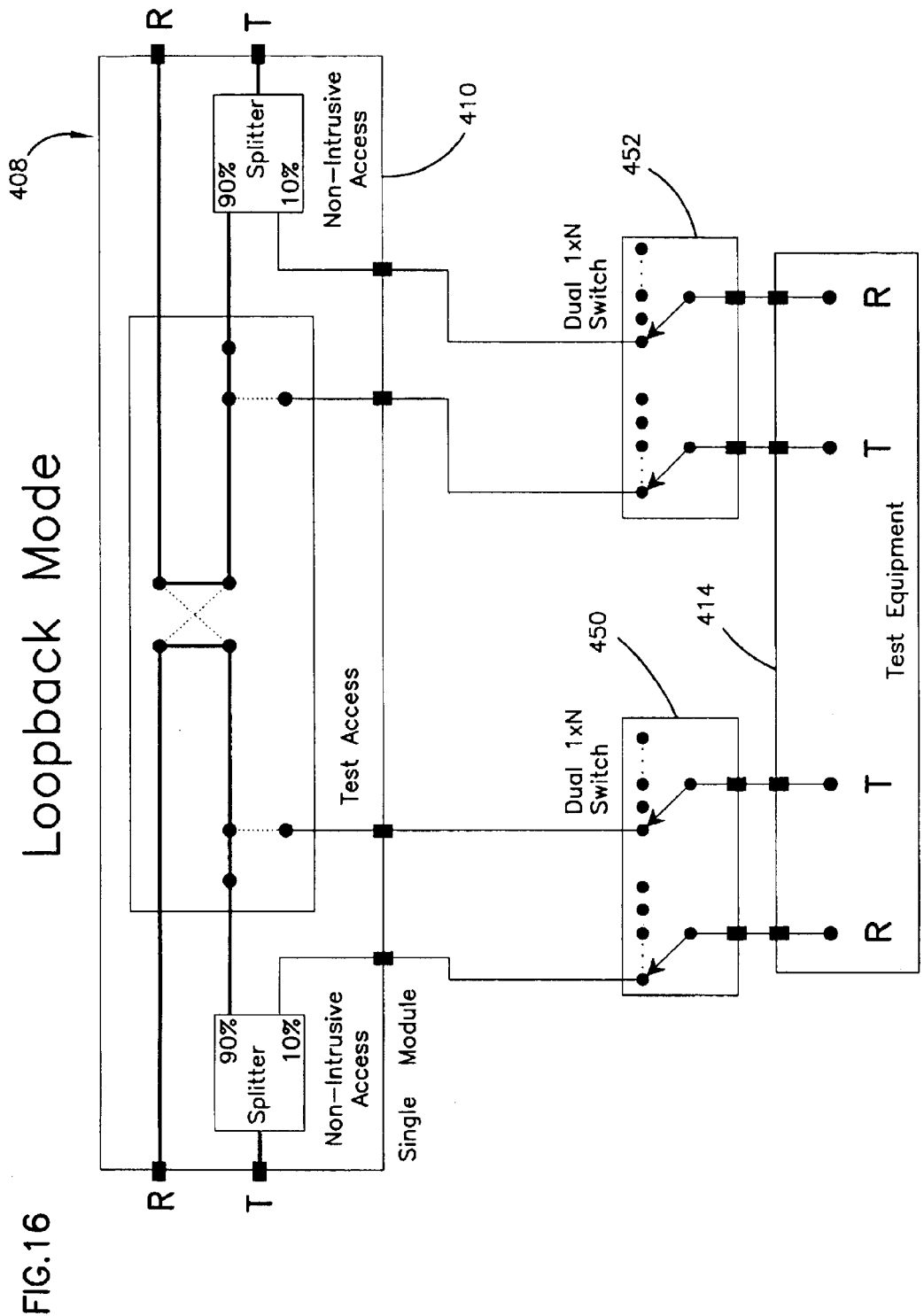
Figure 17:
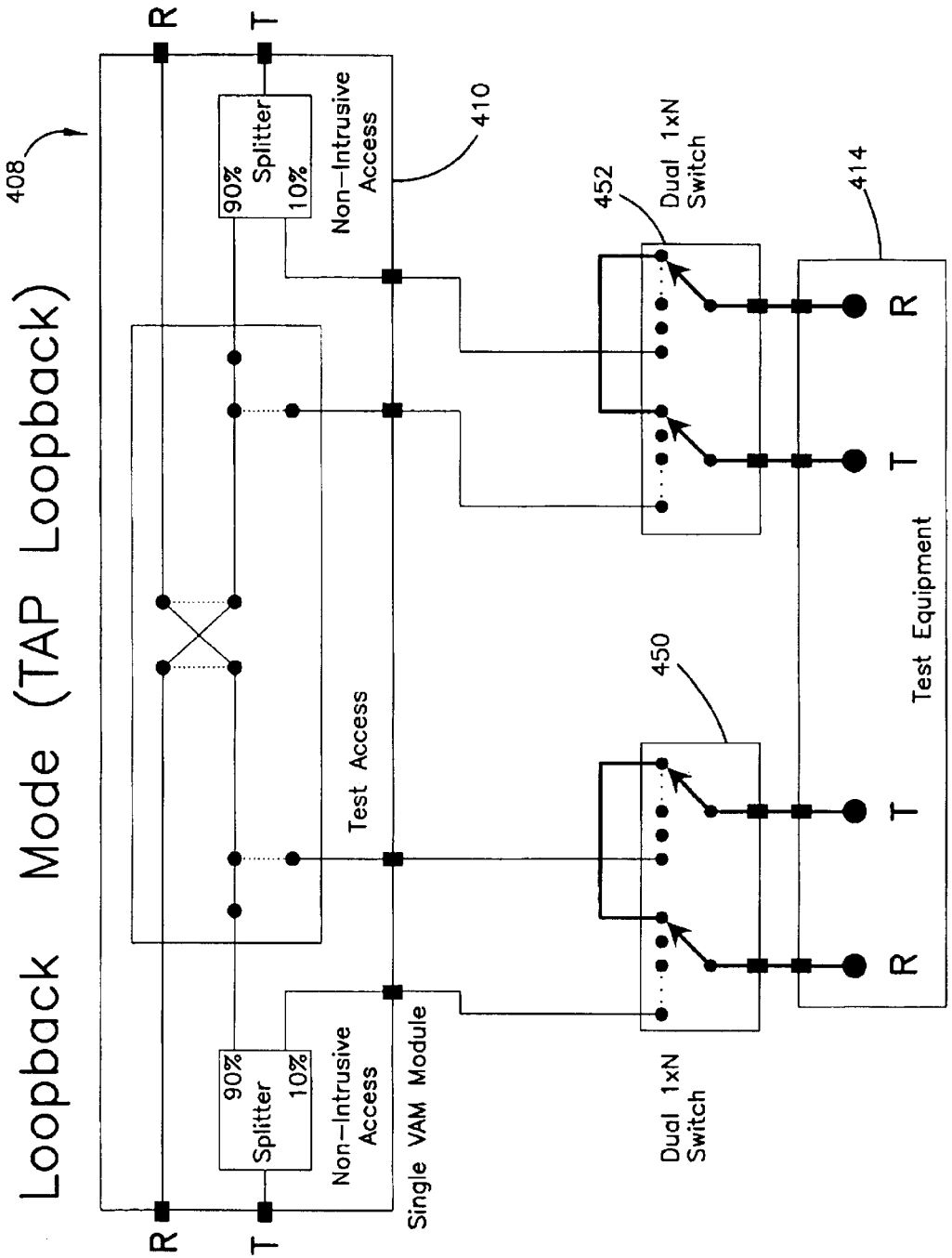
Figure 18:
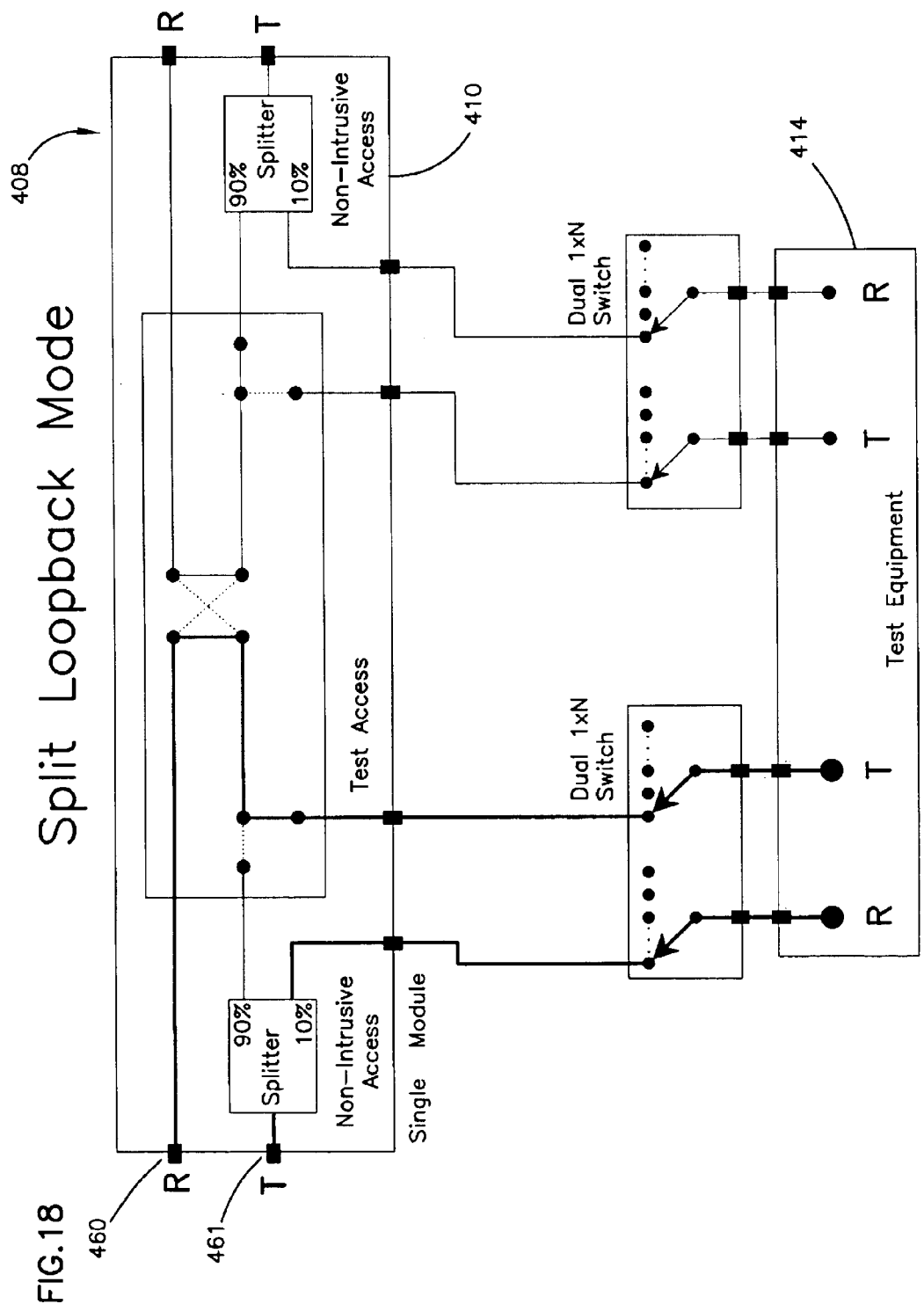
Figure 19:
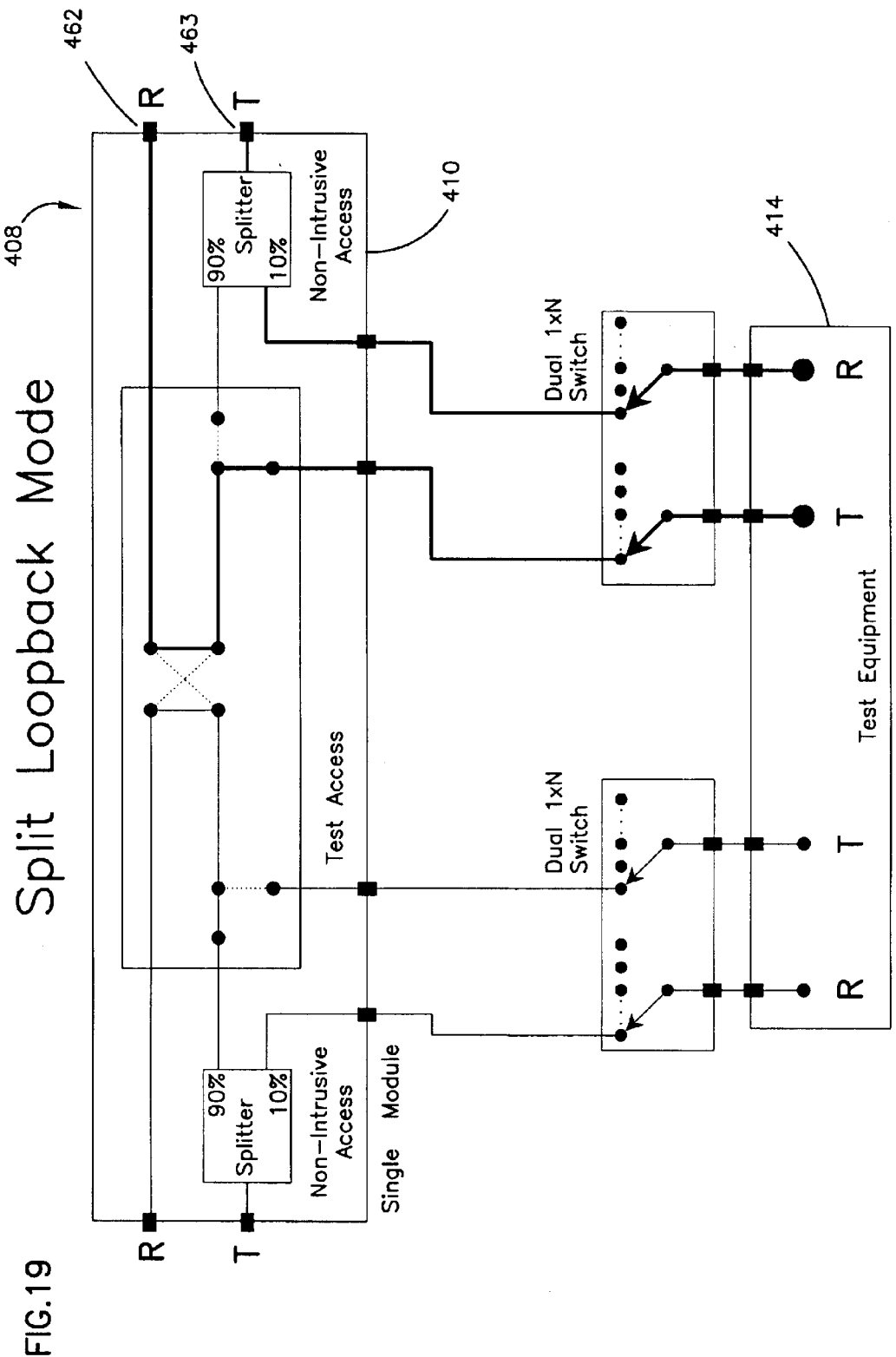
Figure 20:
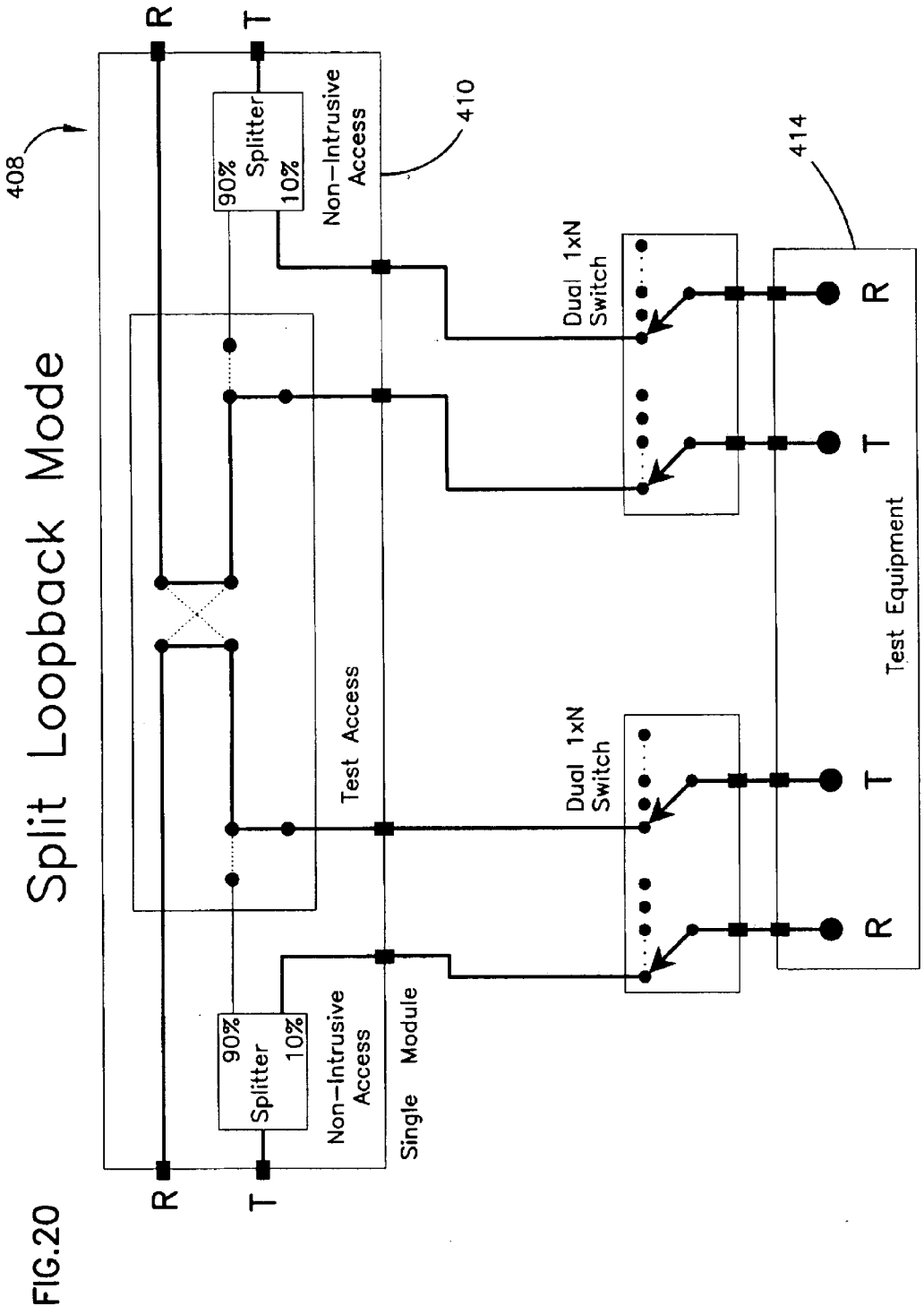
Figure 21:
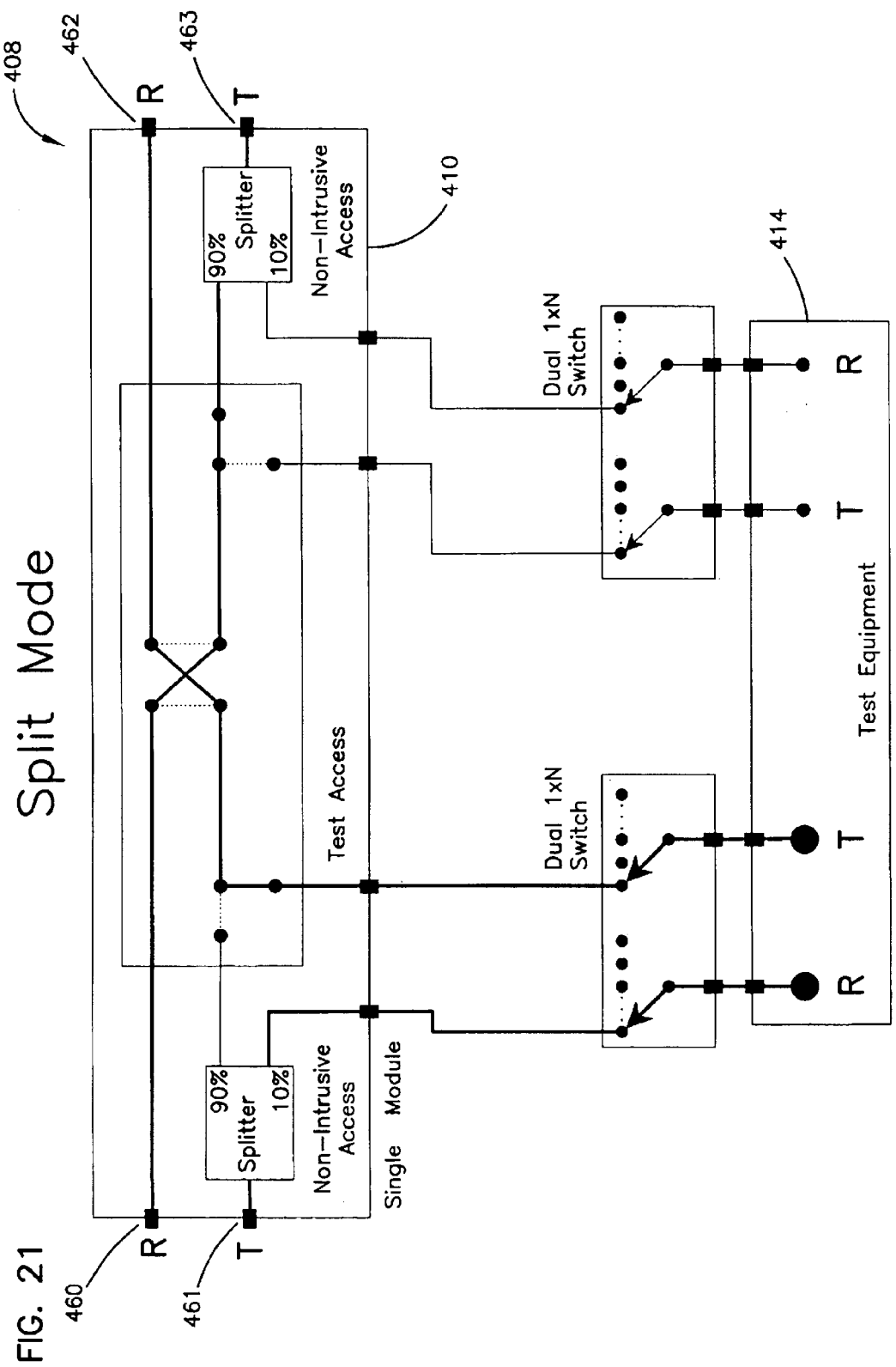
Figure 22:
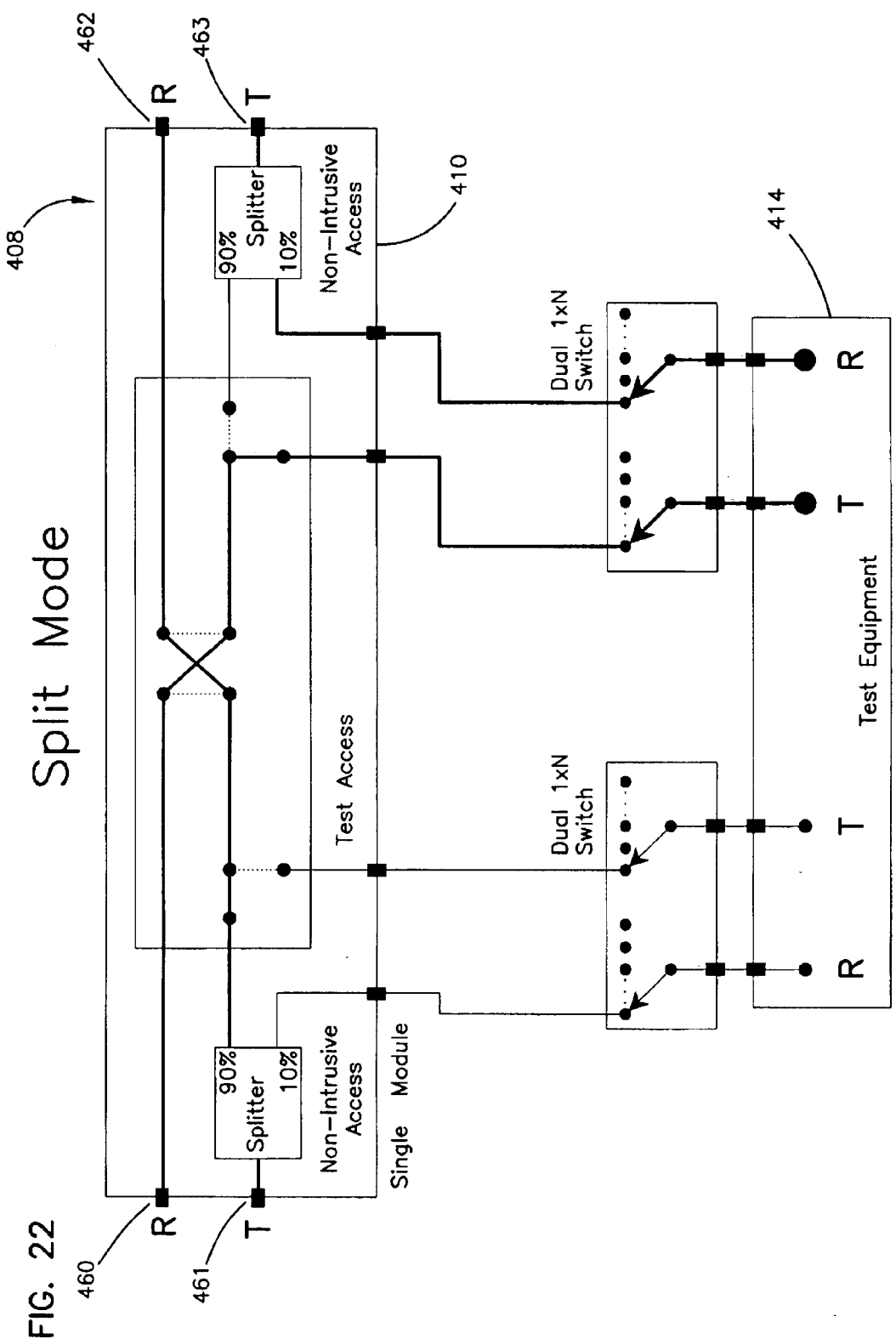
Figure 23:
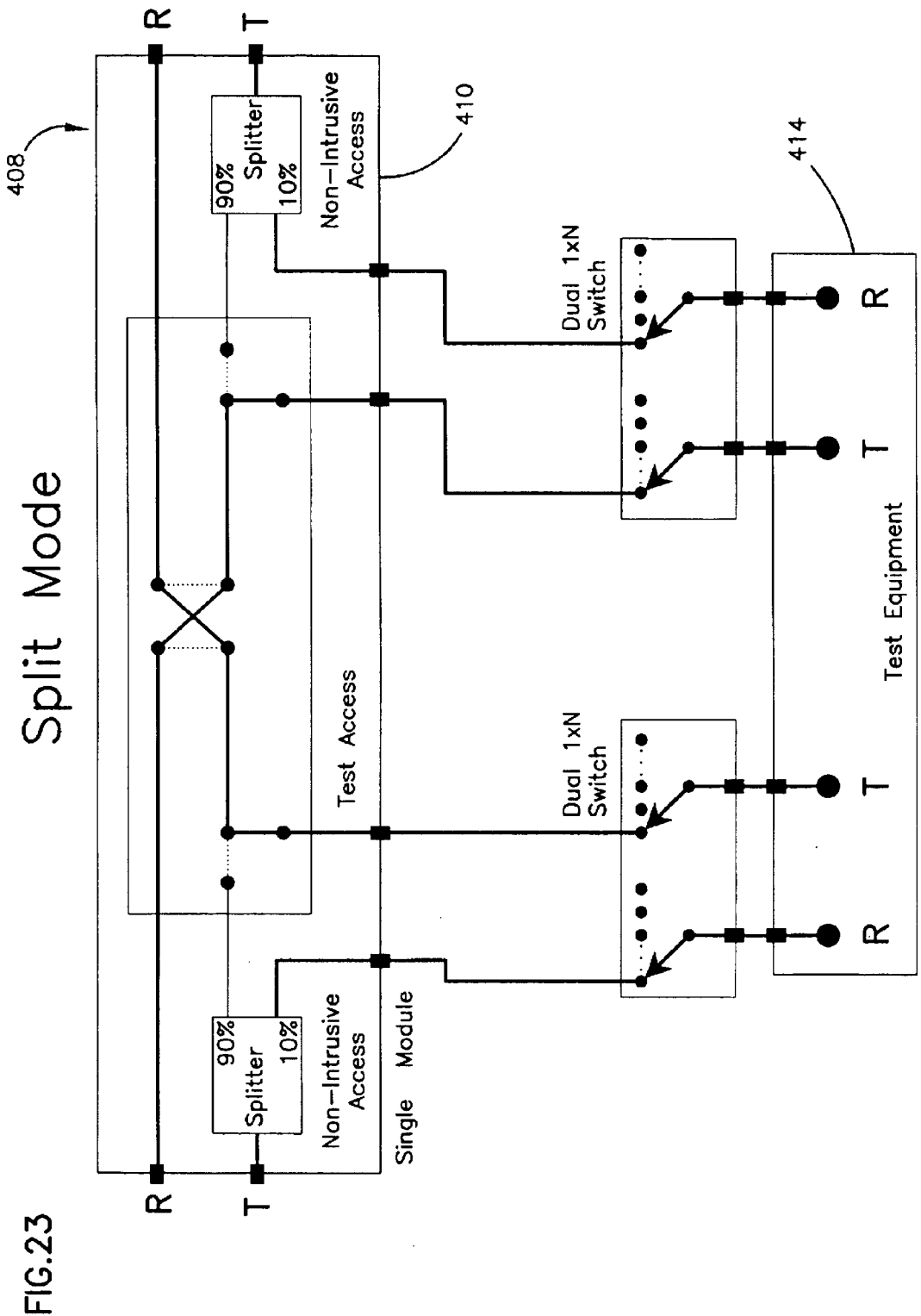
Figure 24:
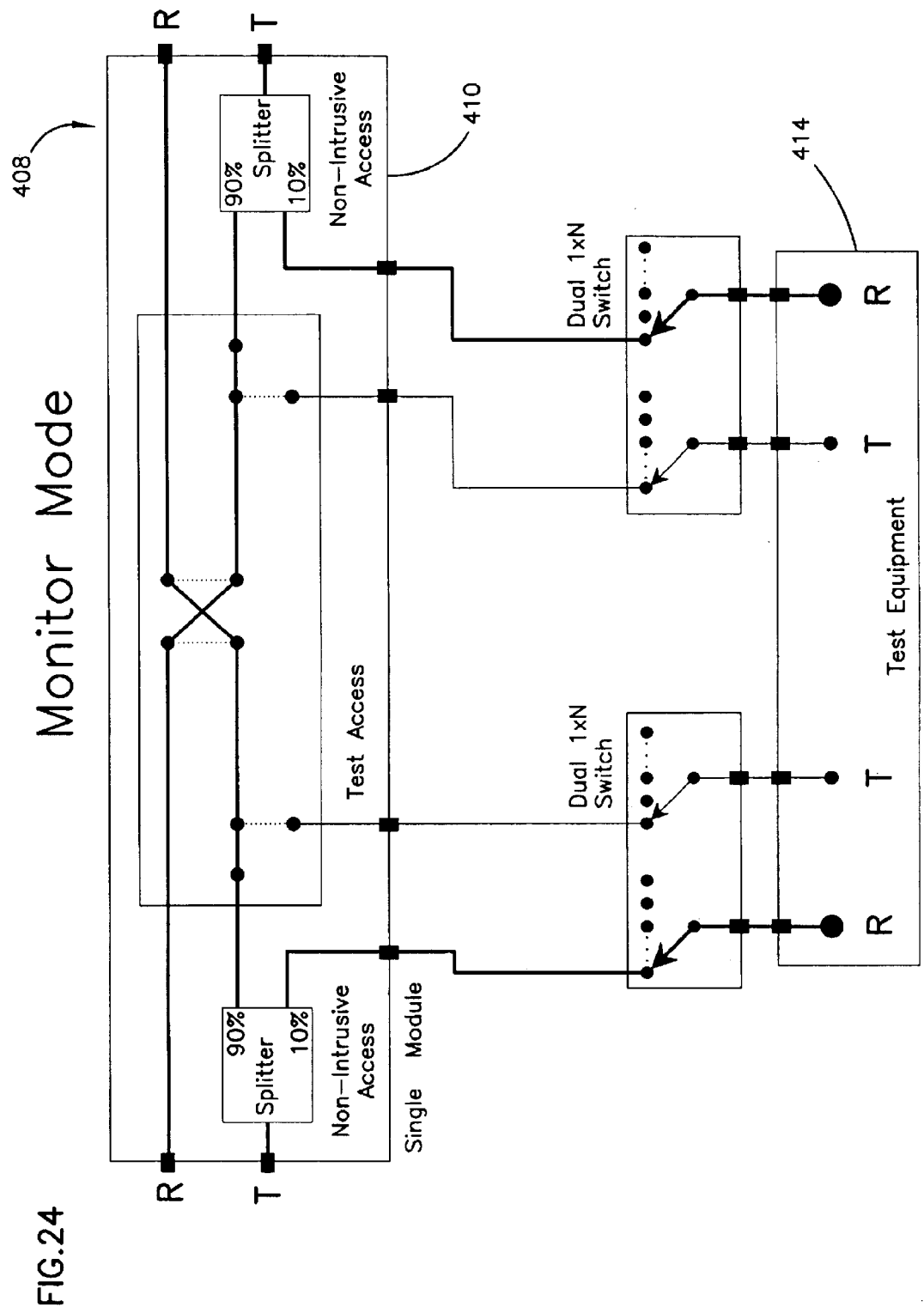

FIG. 14 shows module 410 connected to test equipment 414 and switches 450, 452 in a system 408. FIGS. 15–24 show various applications of system 408 including module 410. FIG. 15 shows system 408 in the transparent mode for connection locations 460–463. FIG. 16 shows system 408 in a loopback mode for connection locations 460–463. FIG. 17 shows system 408 where the test equipment 414 is utilized in a loopback mode. A loopback circuit is provided in connection with one of the pairs of ports of each 1×N switch 450, 452. FIG. 18 shows a split and loopback mode for system 408 with respect to connection locations 460 and 461. FIG. 19 shows system 408 in a split and loop back mode with respect to connection locations 462 and 463. FIG. 20 shows system 408 where both pairs of connection locations 460 and 461, and 462 and 463 are in the split and loopback mode. FIG. 21 shows system 408 in a split mode for connection locations 460 and 461. FIG. 22 shows system 408 in a split mode with respect to connection locations 462 and 463. FIG. 23 shows system 408 where both pairs of connection locations are in a split mode. FIG. 24 shows system 408 in a monitor mode.

FIG. 14 is illustrative of a system 408 in which separate individual modules of the types described previously are not provided. Instead, the optical circuitry of system 408 may be provided in a single module 410. It is to be appreciated that the various optical circuits described above for connecting telecommunications equipment, cables, and monitor, test, and access equipment may be provided in a number of physical constructions, including the preferred modular constructions noted above. In addition, the circuitry can be provided on differently configured modules, an increased or decreased number of modules, or as part of other frames, racks, or housings associated with telecommunications and data connectivity systems. Similarly, the cross-connections noted above for individual modules, such as module 10, can be by patch cords including connectors matable with adapters of module 10, or the connections can be by other optical links which may or may not include patch cords. For example, an optical link may be provided through controller bus 204 of chassis 70 shown in FIGS. 8 and 9.

FIG. 25 illustrates an arrangement of circuit modules within two chassis in accordance with an example embodiment of the present invention. In order to construct the circuit shown in FIG. 2, a collection of circuit modules are located within particular slots of a chassis. Each of the modules shown in FIG. 2 corresponds to the modules found in the chassis. These modules may be constructed using single wide modules and double wide modules within the chassis. The circuits in FIG. 2 are constructed when patch connection between the modules are made. The patch connections for this arrangement in FIGS. 27–28.

FIG. 26 illustrates a set of values for a connection table for use by a master controller processing module in accordance with an example embodiment of the present invention. The connection table includes a tap parameter that identifies a particular circuit pair that is to be configured. The second table entry contains a value for an ODSX module corresponding to the circuit parameter that indicates the test equipment to be used. This information is combined with the patch cord connections shown in FIGS. 27–28 to identify which switching elements need to be configured into a set of required positions to connect the two optical signals on the ODSX module to the test equipment.

Consider an example shown FIG. 2 in which an optical signal to a particular ODSX module 4301 is desired to be connected to a first piece of test equipment 213 for an intrusive test. The first signal input A 4302 is to be connected to a R input 4333 to the test equipment 213. Similarly, the T output of the test equipment 4334 is to be connected to the output signal 4303. In order to accomplish this objective, the Dual 2×2 matrix switching element 212 and two particular 1×24 switching elements 4311–4312 need to be configured. The master controller module commands the first 1×24 switching element 4311 to connect the signal 4302 from the desired ODSX module 4301 to its connection 4321 to the Dual 2×2 matrix switching element 212.

Similarly, the master controller module commands the second 1×24 switching element 4312 to connect the signal 4303 from the desired ODSX module 4301 to its connection 4322 to the Dual 2×2 matrix switching element 212. The master controller commands the Dual 2×2 matrix switching element 212 to connect the two 1×24 switching element signals 4321–4322 to the test equipment 213. The master controller completes the configuration by commanding the ODSX module 4301 to connect the signals as needed. Each of these settings may require a separate operation or series of operations. These sequences of connections are stored in the connection table for use by the master controller when a single command is received to program circuit parameter "n".

Of course, any combination of connections may be constructed using individual connection settings in a connection table as described above. In addition, the order in which the sequence of the switching element settings are made may be specified within the connection tables for use by the master controller or specified in a hard-coded fashion within the master controller software. For example, all of the connections from the test equipment to the particular ODSX module are typically applied first to completely configure the switching network. Once the network configuration is completed, the connection to the optical signals is made by sending the final configuration command to the appropriate ODSX module. This order is used to minimize the effects of the switching network upon the optical signals to be tested. These connections would be the first connections removed once testing is completed for the same reasoning. Any other connection ordering may be specified as desired.

Figure 29:
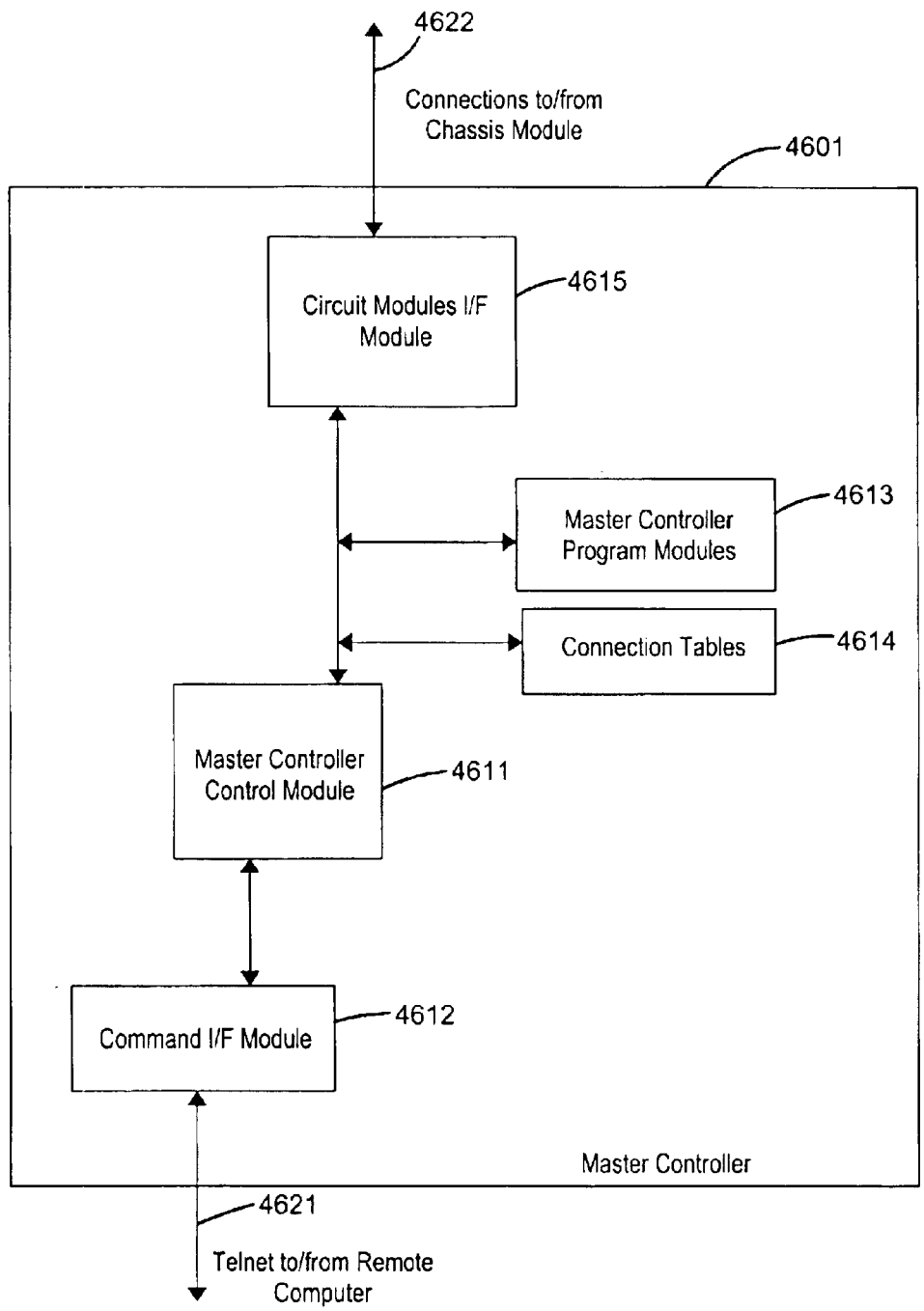
FIG. 29 illustrates a set of processing modules within a master controller processing module in accordance with an embodiment of the present invention.

FIG. 29 illustrates a set of processing modules within a master controller processing module in accordance with an embodiment of the present invention. The master controller processing module 4601 includes a master controller control module 4611, a command interface module 4612, a set of master controller program modules 4613, a set of connection table modules 4614, and a circuit module interface module 4615. The master controller control module 4611 is a processing module responsible for controlling the operation of the master controller module 4601. The master controller control module 4611 performs the operations specified within the set of master controller program modules 4613 in response to commands received from a remote computing system.

The command interface module 4612 provides an interface between the master controller control module 4611 and the remote computing system. The communications between these processing modules may follow one of a number of communications protocols over a variety of communications connections. These connections may be a serial port, an Ethernet port, and any other well defined communications path between to processing systems. This module 4612 processes all communications to ensure that it conforms to the communications connection being used.

Once a command is received by the master controller control module 4611 from the remote computing system, the master controller control module 4611 executes instructions from the master controller program modules 4613 to configure the switching network as specified in the command received from the remote computing system. As discussed above, these connections are defined within a set of connection table modules 4614. The master controller program modules 4613 send the commands to the individual circuit modules to configure the switching elements as needed using the circuit module interface module 4615.

Figure 30:
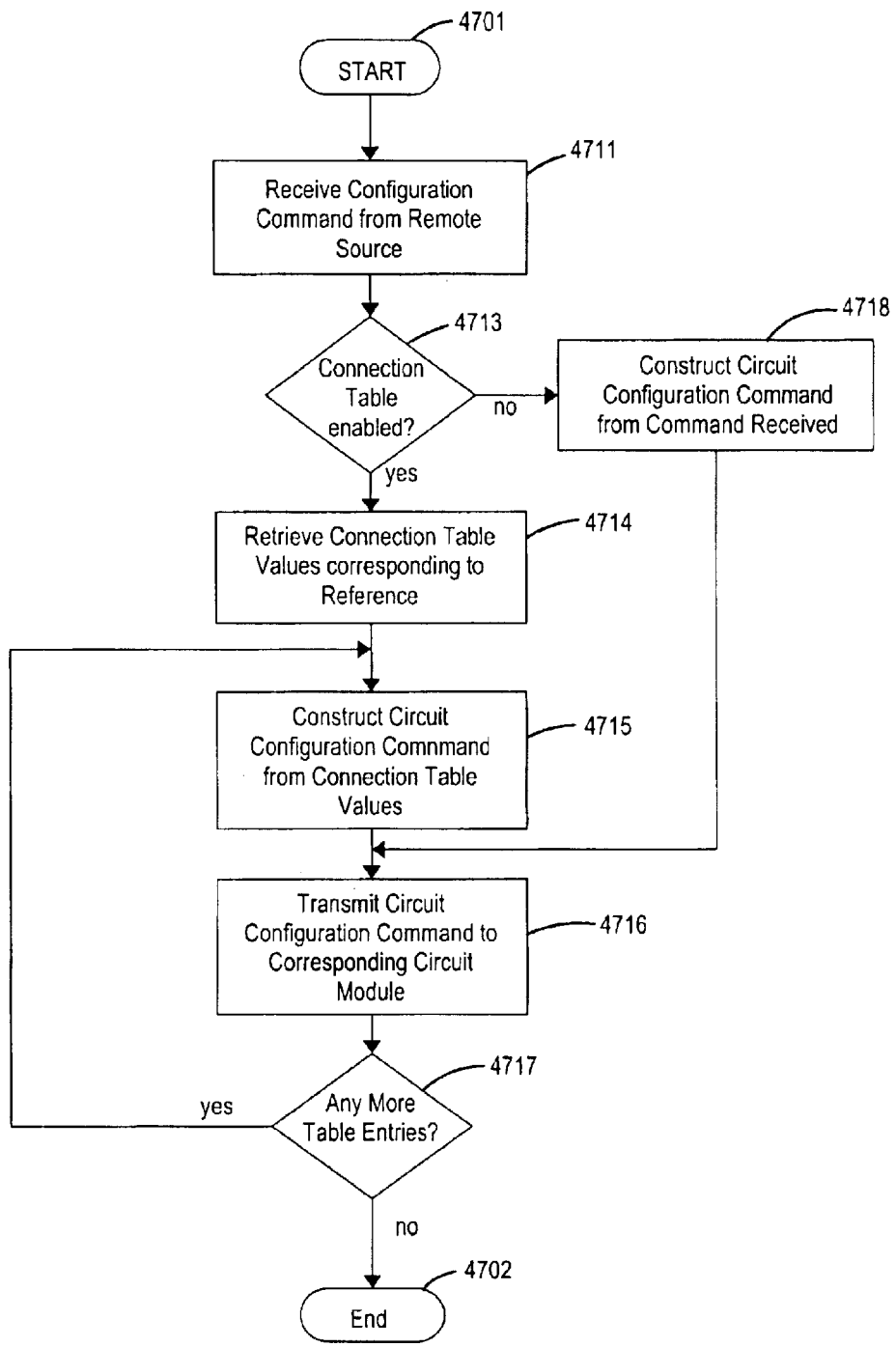
FIG. 30 illustrates an operational flow for the processing steps performed within a master controller processing module in accordance with an embodiment of the present invention.

FIG. 30 illustrates an operational flow for the processing steps performed within a master controller processing module in accordance with an embodiment of the present invention. The processing begins 4701 and module 4711 receives a command from a remote processing system to configure a test circuit. If use of connection tables has been previously enabled, the received command is processed to determine, generate, and transmit the configuration commands using the reference to a connection table contained in the incoming command. Test module 4713 determines whether the use of connection tables has been enabled. If test module 4713 determines that a connection table is to be used, the processing continues to module 4714.

Module 4714 retrieves the connection table values corresponding to the reference to the connection table in the received command. These connection table values are used in module 4715 to construct a configuration command used to configure a setting within a switching network. This configuration command is transmitted to the appropriate circuit module in module 4716. Test module 4717 determines if any additional table entries need to be processed to configure the desired connection. If test module 4717 determines additional entries exist for additional processing, the processing returns to module 4715 to generate and transmit the next configuration command. This process repeats until all of the entries in the connection table have been processed and as a result the connection has been configured. When this result is reached, test module 4717 determines that no additional entries need to be processed, and the processing ends 4702.

Returning now to test module 4713, if test module 4713 determines that a connection table is not to be used when processing the received command, module 4718 constructs the command that corresponds to the received command. This command is then transmitted to the corresponding circuit module using transmit module 4716. Since no additional connection entries will be found by test module 4717, the processing ends.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

While the above embodiments of the present invention describe the use of a connection table to configure a test connection using a specific switching network, one skilled in the art will recognize that the use of the processing system discussed above is merely an example embodiment of the present invention. As long as a connection table is used to configure elements of a test system, the present invention to would be useable in other data processing systems. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method, apparatus, and a computer data product containing a computer program for programming and controlling a fiber optic circuit and module with a switch. Since many embodiments of the invention can be made without departing from the spirit and scope of the invention, the invention resides in the claims hereinafter appended.

What is claimed is:

1. A computer controlled system for programming and controlling a fiber optic circuit comprising:
   a plurality of signal connection modules for providing non-intrusive and intrusive access to circuit signals;
   a test signal routing network for connecting the signal connection modules to test equipment;
   a master controller module for receiving commands from a remote computing system and for configuring the operation of the signal connection modules and the test signal routing network;
   wherein the master controller module comprises a plurality of connection tables, the connection tables containing information for transmitting commands to the signal connection modules and the test signal routing network to configure the fiber optic circuit corresponding to a command received from the remote computing system.

2. The system according to claim 1, wherein the test signal routing network comprises a plurality of 1×N switching elements for connecting the signal connection modules to test equipment.

3. The system according to claim 2, wherein the test signal routing network further comprising a matrix switching element for connecting the plurality of 1×N switching elements to the test equipment.

4. The system according to claim 3, wherein the 1×N switching elements possess a signal connection module for each of the N inputs to the 1×N switching element.

5. The system according to claim 1, wherein the connection table comprises an entry for each switching connection element that is to be configured.

6. The system according to claim 5, wherein the connection table further comprises data entries corresponding to an order in which each of the switching connection element is to be configured.

7. The system according to claim 1, wherein the master controller module configures the operation of the switching network without using the connection tables.

8. The system according to claim 1, wherein the master controller module configures the operation of the signal connection modules without using the connection tables.

9. The system according to claim 1, wherein the master controller module receives commands over an Ethernet connection.

10. The system according to claim 1, wherein the master controller module receives commands over a serial connection.

11. A computer controlled method for programming and controlling a fiber optic circuit the fiber optic circuit comprises a plurality of signal connection modules, a test signal routing network, and a master controller module, the method comprising:
    receiving a circuit configuration command from a remote computing system;
    retrieving a connection table containing data entries used to specify how the signal connection modules and the test signal routing network are to be configured;
    constructing a module configuration command for each data entry retrieved from the connection table; and
    transmitting the module configuration command to the corresponding module to configure the fiber optic circuit.

12. The method according to claim 11, wherein the method further comprises determining whether use of connection tables are enabled when processing circuit configuration command; and
    if the use of connection tables is not enabled, generating and transmitting a module configuration command based upon the received circuit configuration command.

13. The method according to claim 11, wherein the test signal routing network comprises a plurality of 1×N switching elements for connecting the signal connection modules to test equipment.

14. The method according to claim 11, wherein the test signal routing network further comprises a matrix switching element for connecting the plurality of 1×N switching elements to the test equipment.

15. The method according to claim 14, wherein the connection table comprises an entry for each switching connection element that is to be configured equipment optically linked to the first and second dual 1×N optical switches.

16. The method according to claim 14, wherein the connection table further comprises data entries corresponding to an order in which each of the switching connection element is to be configured.

17. A computer data product readable by a computing system and encoding instructions for implementing a computer method for programming and controlling a fiber optic circuit the fiber optic circuit comprises a plurality of signal connection modules, a test signal routing network, and a master controller module, the method comprising:
    receiving a circuit configuration command from a remote computing system;
    retrieving a connection table containing data entries used to specify how the signal connection modules and the test signal routing network are to be configured;
    constructing a module configuration command for each data entry retrieved from the connection table; and
    transmitting the module configuration command to the corresponding module to configure the fiber optic circuit.

18. The computer data product according to claim 17, wherein the method further comprises determining whether use of connection tables are enabled when processing circuit configuration command; and
    if the use of connection tables is not enabled, generating and transmitting a module configuration command based upon the received circuit configuration command.

19. The computer data product according to claim 17, wherein the test signal routing network comprises a plurality of 1×N switching elements for connecting the signal connection modules to test equipment.

20. The computer data product according to claim 17, wherein the test signal routing network further comprises a matrix switching element for connecting the plurality of 1×N switching elements to the test equipment.

21. The computer data product according to claim 20, wherein the connection table comprises an entry for each switching connection element that is to be configured equipment optically linked to the first and second dual 1×N optical switches.

22. The computer data product according to claim 21, wherein the connection table further comprises data entries corresponding to an order in which each of the switching connection element is to be configured.

23. The computer data product of claim 17, wherein the computer data product is a computer readable storage medium.

24. The computer data product of claim 22, wherein the computer data product is a computer readable storage medium.

* * * * *